(12) United States Patent
Aune

(10) Patent No.: US 8,898,376 B2
(45) Date of Patent: Nov. 25, 2014

(54) APPARATUS, SYSTEM, AND METHOD FOR GROUPING DATA STORED ON AN ARRAY OF SOLID-STATE STORAGE ELEMENTS

(75) Inventor: Joshua Aune, Draper, UT (US)

(73) Assignee: Fusion-IO, Inc., Salt Lake City, UT (US)

( * ) Notice: Subject to any disclaimer, the term of this patent is extended or adjusted under 35 U.S.C. 154(b) by 192 days.

(21) Appl. No.: 13/488,021

(22) Filed: Jun. 4, 2012

(65) Prior Publication Data

US 2013/0326117 A1 Dec. 5, 2013

(51) Int. Cl.
*G06F 12/12* (2006.01)

(52) U.S. Cl.
USPC ........................................................ 711/103

(58) Field of Classification Search
CPC .............................. G06F 12/16; G06F 12/0246
USPC ........................................................ 711/103
See application file for complete search history.

(56) References Cited

U.S. PATENT DOCUMENTS

| | | | |
|---|---|---|---|
| 4,695,949 A | 9/1987 | Thatte et al. |
| 4,887,235 A | 12/1989 | Holloway et al. |
| 4,922,414 A | 5/1990 | Holloway et al. |
| 4,984,150 A | 1/1991 | Mori |
| 5,355,483 A | 10/1994 | Serlet |
| 5,434,668 A | 7/1995 | Wootton et al. |
| 5,551,003 A | 8/1996 | Mattson et al. |
| 5,687,368 A | 11/1997 | Nilsen |
| 5,734,861 A | 3/1998 | Cohn et al. |
| 5,787,431 A | 7/1998 | Shaughnessy |
| 5,787,466 A | 7/1998 | Berliner |
| 5,893,121 A | 4/1999 | Ebrahim et al. |
| 5,915,262 A | 6/1999 | Bridgers et al. |
| 5,953,736 A | 9/1999 | O'Connor et al. |
| 6,101,580 A | 8/2000 | Agesen et al. |
| 6,128,623 A | 10/2000 | Mattis et al. |
| 6,128,627 A | 10/2000 | Mattis et al. |
| 6,182,127 B1 | 1/2001 | Cronin, III et al. |
| 6,209,003 B1 | 3/2001 | Mattis et al. |
| 6,237,060 B1 | 5/2001 | Shilts et al. |
| 6,321,240 B1 | 11/2001 | Chilimbi et al. |
| 6,324,620 B1 | 11/2001 | Christenson et al. |
| 6,330,556 B1 | 12/2001 | Chilimbi et al. |
| 6,336,164 B1 | 1/2002 | Gerdt et al. |
| 6,345,313 B1 | 2/2002 | Lindholm |

(Continued)

OTHER PUBLICATIONS

Kim et al., BPLRU: A Buffer Management Scheme for Improving Random Writes in Flash Storage, FAST 2008, 6th USENIX Conference.*

(Continued)

*Primary Examiner* — April Y Blair
*Assistant Examiner* — Edmund Kwong
(74) *Attorney, Agent, or Firm* — Stoel Rives LLC

(57) ABSTRACT

Methods, storage controllers, and systems for grouping data stored on an array of solid-state storage elements are described. One method includes sequentially writing user data to an append point at a head of a log stored in an array of solid-state storage elements. The user data is stored in a plurality of logical erase blocks of the array. The method further includes selecting partially invalidated logical erase blocks of the array based on a characteristic for the partially invalidated logical erase blocks and arranging valid portions of the selected partially invalidated logical erase blocks into groups based on the characteristic. The method further includes writing the groups of valid portions to the log.

19 Claims, 14 Drawing Sheets

(56) References Cited

U.S. PATENT DOCUMENTS

| | | |
|---|---|---|
| 6,381,735 B1 | 4/2002 | Hunt |
| 6,425,058 B1 | 7/2002 | Arimilli et al. |
| 6,434,669 B1 | 8/2002 | Arimilli et al. |
| 6,438,573 B1 | 8/2002 | Nilsen |
| 6,453,319 B1 | 9/2002 | Mattis et al. |
| 6,463,503 B1 | 10/2002 | Jones et al. |
| 6,510,459 B2 | 1/2003 | Cronin, III et al. |
| 6,535,949 B1 * | 3/2003 | Parker .................. 711/103 |
| 6,542,911 B2 | 4/2003 | Chakraborty et al. |
| 6,567,905 B2 | 5/2003 | Otis |
| 6,654,856 B2 | 11/2003 | Frank |
| 6,662,274 B2 | 12/2003 | Subramoney et al. |
| 6,704,839 B2 | 3/2004 | Butterworth et al. |
| 6,708,213 B1 | 3/2004 | Bommaiah et al. |
| 6,718,438 B2 | 4/2004 | Lewis et al. |
| 6,718,457 B2 | 4/2004 | Tremblay et al. |
| 6,738,977 B1 | 5/2004 | Berry et al. |
| 6,763,440 B1 | 7/2004 | Traversat et al. |
| 6,804,762 B1 | 10/2004 | Dussud et al. |
| 6,848,026 B2 | 1/2005 | DeSota et al. |
| 6,865,657 B1 | 3/2005 | Traversat et al. |
| 6,950,837 B2 | 9/2005 | Subramoney et al. |
| 6,950,838 B2 | 9/2005 | Wright et al. |
| 6,965,968 B1 | 11/2005 | Touboul |
| 6,973,554 B2 | 12/2005 | Dussud |
| 6,993,540 B2 | 1/2006 | Hudson et al. |
| 7,089,273 B2 | 8/2006 | Wu et al. |
| 7,103,723 B2 | 9/2006 | Cierniak |
| 7,107,430 B2 | 9/2006 | Grossman et al. |
| 7,120,750 B1 | 10/2006 | Seidl et al. |
| 7,136,973 B2 | 11/2006 | Sinclair |
| 7,185,069 B2 | 2/2007 | Costin et al. |
| 7,203,756 B2 | 4/2007 | Tapperson |
| 7,237,064 B2 | 6/2007 | Lewis |
| 7,284,108 B2 | 10/2007 | Dussud |
| 7,330,938 B2 | 2/2008 | Nenov et al. |
| 7,337,201 B1 | 2/2008 | Yellin et al. |
| 7,386,707 B2 | 6/2008 | Kurata et al. |
| 7,389,385 B2 | 6/2008 | Serrano et al. |
| 7,395,258 B2 | 7/2008 | Altinel et al. |
| 7,404,182 B1 | 7/2008 | Garthwaite et al. |
| 7,412,532 B2 | 8/2008 | Gondhalekar et al. |
| 7,421,539 B1 | 9/2008 | Seidl et al. |
| 7,480,767 B2 | 1/2009 | Moser |
| 7,483,930 B1 | 1/2009 | Wright et al. |
| 7,490,117 B2 | 2/2009 | Subramoney et al. |
| 7,509,471 B2 | 3/2009 | Gorobets |
| 7,519,948 B1 | 4/2009 | Cornish |
| 7,539,822 B1 | 5/2009 | Nagarajan et al. |
| 7,565,499 B1 | 7/2009 | Garthwaite |
| 2002/0056025 A1 | 5/2002 | Qiu et al. |
| 2005/0091456 A1 | 4/2005 | Huck |
| 2005/0144361 A1 | 6/2005 | Gonzalez et al. |
| 2006/0129763 A1 | 6/2006 | Royer, Jr. et al. |
| 2006/0136668 A1 | 6/2006 | Rudelic |
| 2007/0101095 A1 | 5/2007 | Gorobets |
| 2007/0150654 A1 | 6/2007 | Shin et al. |
| 2008/0082729 A1 | 4/2008 | Moon et al. |
| 2008/0133836 A1 | 6/2008 | Magid et al. |
| 2008/0288713 A1 | 11/2008 | Lee et al. |
| 2009/0063795 A1 | 3/2009 | Yueh |
| 2012/0239868 A1 | 9/2012 | Ryan et al. |

OTHER PUBLICATIONS

Rahiman et al., Flash Memories, Ch.4 Block Clean Process in Flash Memory, 2011, ISBN 978-953-307-272-2, pp. 83-94.*

Matthews et al., Improving the Performance of Log-Structured File Systems with Adaptive Methods, Proceedings of the 16th ACM Symposium on Operating Systems Principles, Oct. 1997, pp. 238-251.*

Chiang et al., Using Data Clustering to Improve Cleaning Performance for Flash Memory, Software Practice and Experience, 1999, John Wiley & Sons, Ltd.*

Kim et al., An Effective Flash Memory Manager for Reliable Flash Memory Space Management, IEICE Trans. In. & Syst., vol. E85-D, No. 6, Jun. 2002, pp. 950-964.*

Kim et al., BPLRU: A Buffer Management Scheme for Improving Random Writes in Flash Storage, FAST 2008, 6th USENIX Conference, Feb. 26, 2008.*

Menon et al., An Age-Threshold Algorithm for Garbage Collection in Log-Structured Arrays and File Systems, High Performance Computing Systems and Applications, 1998, pp. 119-132.*

"Cache Mapping and Associativity", Laynetworks, downloaded Oct. 14, 2009, pp. 3, http://www.laynetworks.com/Cache%20Mapping%20and%20Associativity.htm.

"SanDisk Introduces ExtremeFFS, Aims 100 Times Faster SSDs", Nov. 6, 2008, pp. 11, http://www.physorg.com/news145186489.html.

Marty, Michael. R., "Virtual Hierarchies to Support Server Consolidation", ACM, Jun. 9-13, 2007, pp. 11.

Jiang, Song, "Coordinated Multilevel Buffer Cache Management with Consistent Access Locality Quantification", IEEE Transactions on Computers, Jan. 2007, pp. 2, vol. 56, No. 1, http://doi.ieeecomputersociety.org/10.1109/TC.2007.7.

Kang, Hong-Kyu, "A New Method to the Replacement Policy in Multiple Buffer Cache Environment", Korea University, pp. 5, Seoul, Korea.

Demerjian, Charlie, "Sandisk Extreme FFS Speeds SSDS", SemiAccurate, Jun. 8, 2009, pp. 5, semiaccurate.com/2009/06/08/sandisk-extreme-ffs-speeds-ssds/#.UUflrBzvtCY.

* cited by examiner

APPARATUS, SYSTEM, AND METHOD FOR GROUPING DATA STORED ON AN ARRAY OF SOLID-STATE STORAGE ELEMENTS

BACKGROUND

1. Field of the Invention

The disclosure relates to data storage and, more particularly, to grouping data stored on an array of solid-state storage elements.

2. Description of the Related Art

When storing data using a log-based structure, previously stored portions of the data may be invalidated as updated versions of the data are written to the log-based structure. These invalidated portions may eventually be erased and used to store other data. Erasing some storage media, however, may take time that is an order of magnitude or longer more than programming or reading the media. Consequently, erase operations may be avoided or postponed by some log-based structures. As a result, a significant amount of storage capacity remains invalidated and unused, reducing the usable capacity of the device.

SUMMARY OF THE INVENTION

Embodiments of a method are described. In one embodiment, a method includes sequentially writing user data to an append point at a head of a log stored in an array of solid-state storage elements. The user data is stored in a plurality of logical erase blocks of the array. The method further includes selecting partially invalidated logical erase blocks of the array based on a characteristic for the partially invalidated logical erase blocks, arranging valid portions of the selected partially invalidated logical erase blocks into groups based on the characteristic, and writing the groups of valid portions to the log. Other method embodiments are also described.

Embodiments of an apparatus are described. In one embodiment, an apparatus for grouping data stored on an array of solid-state storage elements includes a write data module, a selection module, and a grouping module. The write data module sequentially writes user data to an append point at a head of a log stored in an array of solid-state storage elements. The user data is stored in a plurality of logical erase blocks of the array. The selection module selects partially invalidated logical erase blocks of the array based on a characteristic for the partially invalidated logical erase blocks. The grouping module arranges valid portions of the selected partially invalidated logical erase blocks into groups based on the characteristic. The write data module writes the groups of valid portions to the log and writes at least one of the groups to a position in the log other than the head of the log based on the characteristic. Other apparatus embodiments are also described.

Embodiments of a system are described. In one embodiment, a system includes an array of solid-state storage elements and a storage controller. The storage controller includes a write data module that sequentially writes user data to an append point at a head of a log stored in an array of solid-state storage elements. The user data is stored in a plurality of logical erase blocks of the array. The storage controller also includes a selection module that selects partially invalidated logical erase blocks of the array based on a characteristic for the partially invalidated logical erase blocks and a grouping module that arranges valid portions of the selected partially invalidated logical erase blocks into groups based on the characteristic. The write data module writes the groups of valid portions to the log. Other systems embodiments are also described.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Figure 1:
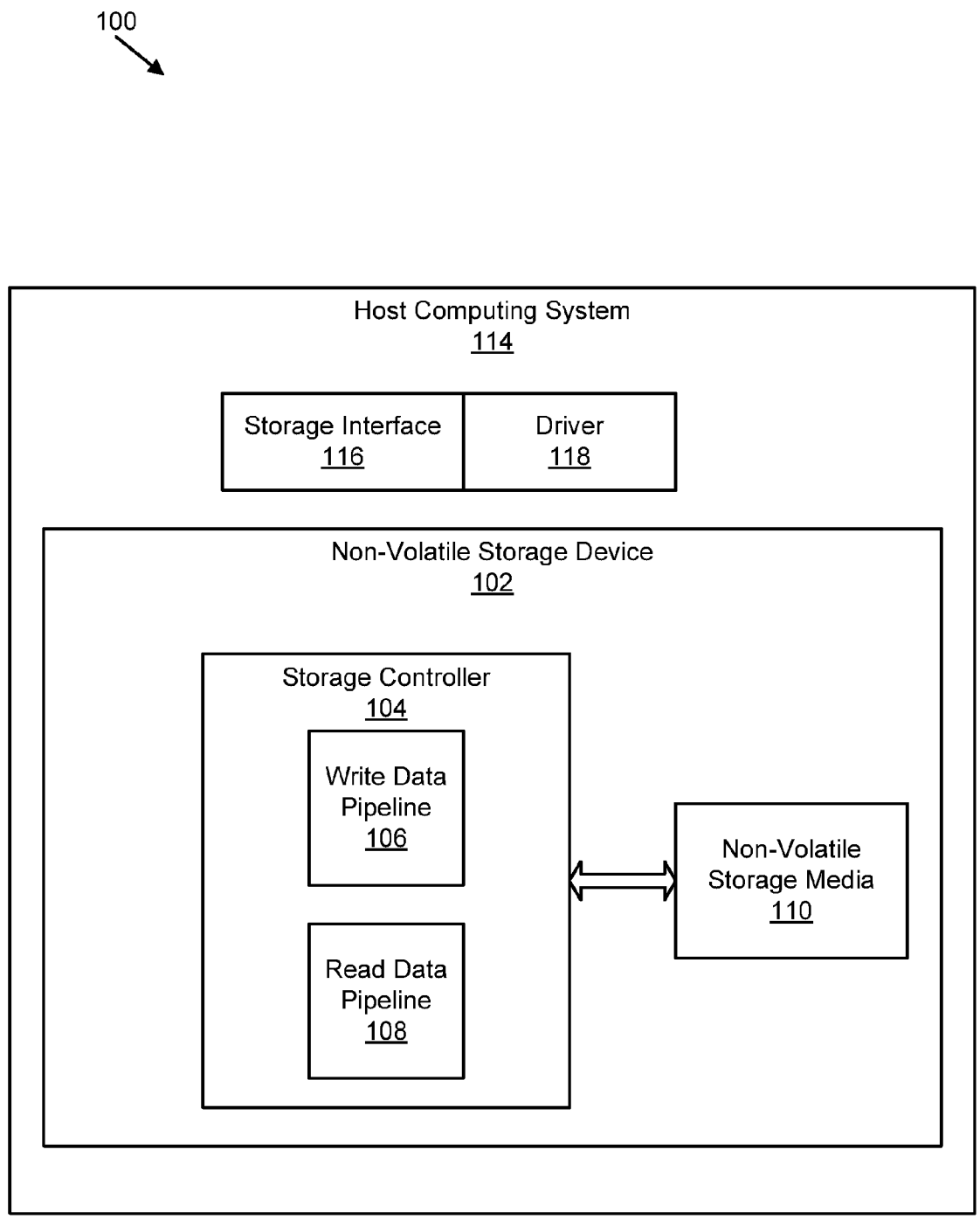
FIG. 1 is a block diagram of a system comprising a non-volatile storage device according to one embodiment.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention. These features and advantages of the present invention will become more fully apparent from the following description and appended claims, or may be learned by the practice of the invention as set forth hereinafter.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more computer readable media.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a computer readable medium may take any form capable of storing machine-readable instructions on a digital processing apparatus. A computer readable medium may be embodied by a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

FIG. 1 depicts one embodiment of a system 100 for reducing data loss. In the depicted embodiment, the system 100 includes a host computing system 114 and a storage device 102. The host computing system 114 may be a computer such as a server, laptop, desktop, a mobile device, or other computing device known in the art. The host computing system 114 typically includes components such as memory, processors, buses, and other components as known to those of skill in the art.

The host computing system 114 stores data in the storage device 102 and communicates data with the storage device 102 via a communications connection. The storage device 102 may be internal to the host computing system 114 or external to the host computing system 114. The communications connection may be a bus, a network, or other manner of connection allowing the transfer of data between the host computing system 114 and the storage device 102. In one embodiment, the storage device 102 is connected to the host computing system 114 by a PCI connection such as PCI express ("PCI-e"). The storage device 102 may be a card that plugs into a PCI-e connection on the host computing system 114.

The storage device 102, in the depicted embodiment, performs data storage operations such as reads, writes, erases, etc. In certain embodiments, a power connection and the communications connection for the storage device 102 are part of the same physical connection between the host computing system 114 and the storage device 102. For example, the storage device 102 may receive power over PCI, PCI-e, serial advanced technology attachment ("serial ATA" or "SATA"), parallel ATA ("PATA"), small computer system interface ("SCSI"), IEEE 1394 ("FireWire"), Fiber Channel, universal serial bus ("USB"), PCIe-AS, or another connection with the host computing system 114.

The storage device 102 provides nonvolatile storage for the host computing system 114. FIG. 1 shows the storage device 102 as a non-volatile storage device 102 comprising a storage controller 104, a write data pipeline 106, a read data pipeline 108, and nonvolatile non-volatile storage media 110. The storage device 102 may contain additional components that are not shown in order to provide a simpler view of the storage device 102.

The non-volatile storage media 110 stores data such that the data is retained even when the storage device 102 is not powered. In some embodiments, the non-volatile storage media 110 comprises a solid-state storage media, such as flash memory, nano random access memory ("NRAM"), magneto-resistive RAM ("MRAM"), dynamic RAM ("DRAM"), phase change RAM ("PRAM"), Racetrack memory, Memristor memory, nanocrystal wire-based memory, silicon-oxide based sub-10 nanometer process memory, graphene memory, Silicon-Oxide-Nitride-Oxide-Silicon ("SONOS"), Resistive random-access memory ("RRAM"), programmable metallization cell ("PMC"), conductive-bridging RAM ("CBRAM"), and the like. While, in the depicted embodiment, the storage device 102 includes non-volatile storage media 110, in other embodiments, the storage device 102 may include magnetic media such as hard disks, tape, and the like, optical media, or other nonvolatile data storage media. The storage device 102 also includes a storage controller 104 that coordinates the storage and retrieval of data in the non-volatile storage media 110. The storage controller 104 may use one or more indexes to locate and retrieve data, and perform other operations on data stored in the storage device 102. For example, the storage controller 104 may include a groomer for performing data grooming operations such as garbage collection.

As shown, the storage device 102, in certain embodiments, implements a write data pipeline 106 and a read data pipeline 108, an example of which is described in greater detail below. The write data pipeline 106 may perform certain operations on data as the data is transferred from the host computing system 114 into the non-volatile storage media 110. These operations may include, for example, error correction code (ECC) generation, encryption, compression, and others. The read data pipeline 108 may perform similar and potentially inverse operations on data that is being read out of non-volatile storage media 110 and sent to the host computing system 114.

In one embodiment, the host computing system 114 includes one or more other components in addition to the storage device 102, such as additional storage devices, graphics processors, network cards, and the like. Those of skill in the art, in view of this disclosure, will appreciate the different types of components that may be in a host computing system 114. The components may be internal or external to the host computing system 114. In one embodiment, some of the components may be PCI or PCI-e cards that connect to the host computing system 114 and receive power through the host computing system 114.

In some embodiments, the driver 118, or alternatively the storage interface 116, is an application program interface ("API") and acts to translate commands and other data to a form suitable to be sent to a storage controller 104. In another embodiment, the driver 118 includes one or more functions of the storage controller 104. For example, the driver 118 may include all or a portion of the modules described below and may include one or more indexes or maps for storage device 102.

A logical identifier, as used in this application, is an identifier of a data unit that differs from a physical address where data of the data unit is stored. A data unit, as used in this application, is any set of data that is logically grouped together. A data unit may be a file, an object, a data segment of a redundant array of inexpensive/independent disks/drives ("RAID") data stripe, or other data set used in data storage. The data unit may be executable code, data, metadata, directories, indexes, any other type of data that may be stored in a memory device, or a combination thereof. The data unit may be identified by a name, by a logical address, a physical address, an address range, or other convention for identifying data units. A logical identifier includes data unit identifiers, such as a file name, an object identifier, an inode, Universally Unique Identifier ("UUID"), Globally Unique Identifier ("GUID"), or other data unit label, and may also include a logical block address ("LBA"), cylinder/head/sector ("CHS"), or other lower level logical identifier. A logical identifier generally includes any logical label that can be mapped to a physical location.

In some embodiment, the storage device 102 stores data in a sequential log-based format on the non-volatile storage media 110. For example, when a data unit is modified, data of the data unit is read from one physical storage location, modified, and then written to a different physical storage location. The order and sequence of writing data to the data storage device 102 may comprise an event log of the sequence of storage operations performed on the non-volatile storage device 102. By traversing the event log (and/or replaying the sequence of storage operations), and storage metadata, such as a forward index can be constructed or reconstructed.

In a typical random access device, logical identifiers have almost a one-to-one correspondence to physical addresses of the random access device. This one-to-one mapping in a typical random access device (excluding a small number of physical addresses on the random access device reserved for bad block mapping) also correlates to a near one-to-one relationship between storage capacity associated with logical identifiers and physical capacity associated with physical addresses. For example, if a logical identifier is a logical block address ("LBA"), each logical block associated with an LBA has a fixed size. A corresponding physical block on the random access device is typically the same size as a logical block. This enables a typical file server 114/file system to manage physical capacity on the random access device by managing logical identifiers, such as LBAs. This continuity of LBA to PBA mapping is generally depended upon and utilized by file systems to defragment the data stored on the data storage device. Similarly, some systems may use this continuity to locate the data on specific physical tracks to improve performance as is the case of a technique called "short stroking" the disk drive. The highly predictable LBA to PBA mapping is essential in certain applications to indirectly manage the storage of the data in the physical storage space through direct management of the logical address space.

However, the storage device 102 may be a log structured file system such that there is no "fixed" relationship or algorithm to determine the mapping of the LBA to the PBA, or in another embodiment, may be random access, but may be accessed by more than one client or file server/file system such that the logical identifiers allocated to each client or file server/file system represent a storage capacity much larger than the one-to-one relationship of logical to physical identifiers of typical systems. The storage device 102 may also be thinly provisioned such that one or more clients each has an allocated logical address range that is much larger than the storage capacity of the storage devices 102 in the storage device 102. In the system 100, the storage device 102 manages and allocates logical identifiers such that there is no pre-determined one-to-one or near one-to-one relationship between logical identifiers and physical identifiers.

The system 100 is advantageous because it allows more efficient management of storage capacity than typical storage systems. For example, for typical random access devices accessible by a number of clients, if each client is allocated a certain amount storage space, the storage space typically will exist and be tied up in the allocations even if the actual amount of storage space occupied is much less. The system 100 is also advantageous because the system 100 reduces complexity of standard thin provisioning systems connected to storage devices 102. A standard thin provisioning system has a thin provisioning layer comprising a logical-to-logical mapping between logical identifiers in the space logical address space and physical storage locations. The system 100 is more efficient because multiple layers of mapping are eliminated and thin provisioning (logical-to-physical mapping) is done at the lowest level.

Figure 2:
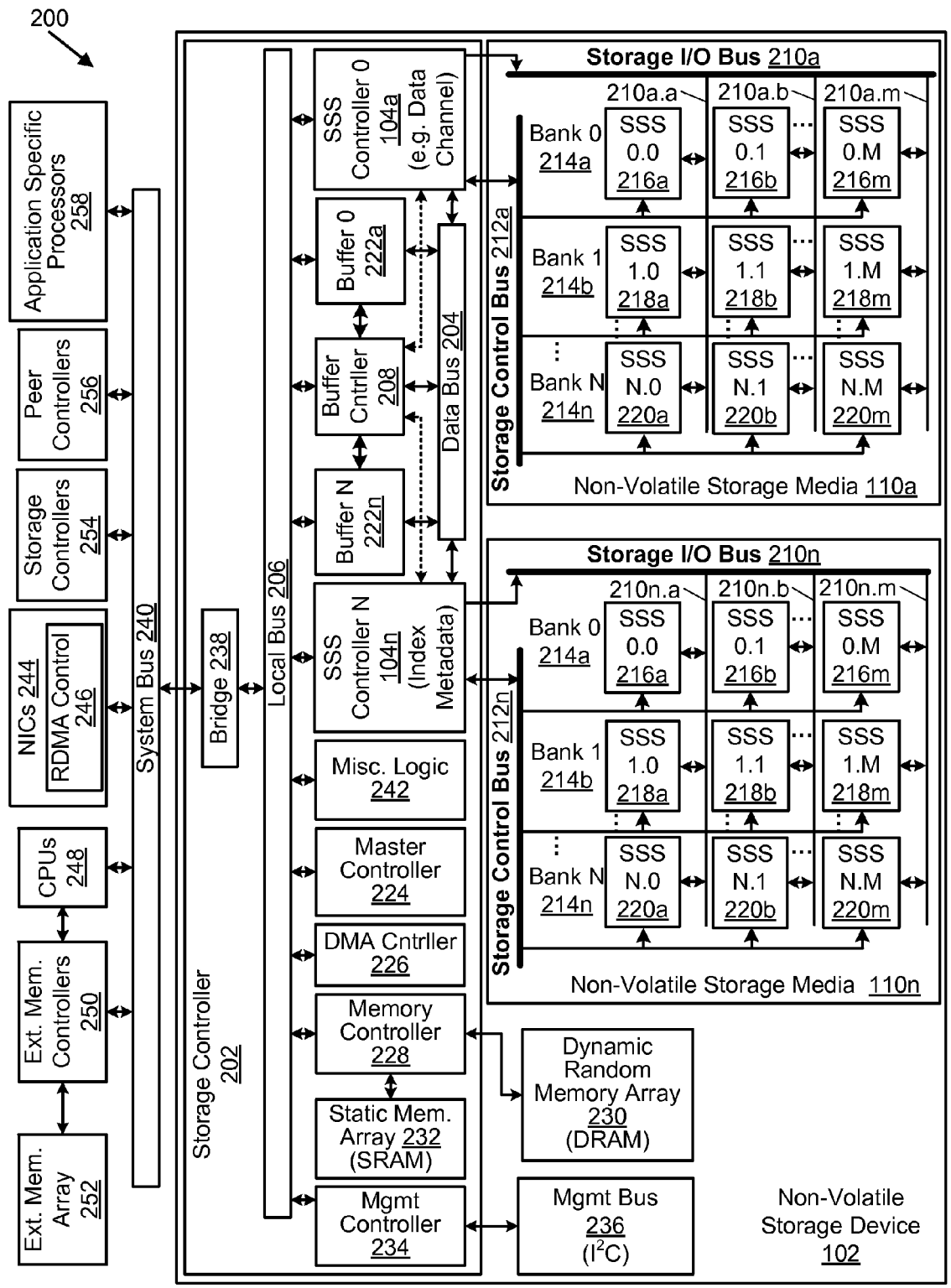
FIG. 2 is a block diagram of one embodiment of a non-volatile storage device.

FIG. 2 is a schematic block diagram illustrating one embodiment 200 of a non-volatile storage device controller 202 in a non-volatile storage device 102 in accordance with the present invention. The non-volatile storage device controller 202 may include a number of storage controllers 0-N 104a-n, each controlling non-volatile storage media 110. In the depicted embodiment, two non-volatile controllers are shown: non-volatile controller 0 104a and storage controller N 104n, and each controlling respective non-volatile storage media 110a-n. In the depicted embodiment, storage controller 0 104a controls a data channel so that the attached non-volatile storage media 110a stores data. Storage controller N 104n controls an index metadata channel associated with the stored data and the associated non-volatile storage media 110n stores index metadata. In an alternate embodiment, the non-volatile storage device controller 202 includes a single non-volatile controller 104a with a single non-volatile storage media 110a. In another embodiment, there are a plurality of storage controllers 104a-n and associated non-volatile storage media 110a-n. In one embodiment, one or more non-volatile controllers 104a-104n-1, coupled to their associated non-volatile storage media 110a-110n-1, control data while at least one storage controller 104n, coupled to its associated non-volatile storage media 110n, controls index metadata.

In one embodiment, at least one non-volatile controller 104 is a field-programmable gate array ("FPGA") and controller functions are programmed into the FPGA. In a particular embodiment, the FPGA is a Xilinx® FPGA. In another embodiment, the storage controller 104 comprises components specifically designed as a storage controller 104, such as an application-specific integrated circuit ("ASIC") or custom logic solution. Each storage controller 104 typically includes a write data pipeline 106 and a read data pipeline 108, which are described further in relation to FIG. 3. In another embodiment, at least one storage controller 104 is made up of a combination FPGA, ASIC, and custom logic components.

The non-volatile storage media 110 is an array of non-volatile storage elements 216, 218, 220, arranged in banks 214, and accessed in parallel through a bi-directional storage input/output ("I/O") bus 210. The storage I/O bus 210, in one embodiment, is capable of unidirectional communication at any one time. For example, when data is being written to the non-volatile storage media 110, data cannot be read from the non-volatile storage media 110. In another embodiment, data can flow both directions simultaneously. Bi-directional, as used herein with respect to a data bus, refers to a data pathway that can have data flowing in only one direction at a time, but when data flowing one direction on the bi-directional data bus is stopped, data can flow in the opposite direction on the bi-directional data bus.

A non-volatile storage element (e.g., SSS 0.0 216a) is typically configured as a chip (a package of one or more dies) or a die on a circuit board. As depicted, a non-volatile storage element (e.g., 216a) operates independently or semi-independently of other non-volatile storage elements (e.g., 218a) even if these several elements are packaged together in a chip package, a stack of chip packages, or some other package element. As depicted, a row of non-volatile storage elements 216a, 216b, 216m is designated as a bank 214. As depicted, there may be "n" banks 214a-n and "m" non-volatile storage elements 216a-m, 218a-m, 220a-m per bank in an array of n×m non-volatile storage elements 216, 218, 220 in a non-volatile storage media 110. Of course, different embodiments may include different values for n and m. In one embodiment, a non-volatile storage media 110a includes twenty non-volatile storage elements 216a-216m per bank 214 with eight banks 214. In one embodiment, the non-volatile storage media 110a includes twenty-four non-volatile storage elements 216a-216m per bank 214 with eight banks 214. In addition to the n×m storage elements 216a-216m, 218a-218m, 220a-220m, one or more additional columns (P) may also be addressed and operated in parallel with other non-volatile storage elements 216a, 216b, 216m for one or more rows. The added P columns in one embodiment, store parity data for the portions of an ECC chunk (i.e., an ECC codeword) that span m storage elements for a particular bank. In one embodiment, each non-volatile storage element 216, 218, 220 is comprised of single-level cell ("SLC") devices. In another embodiment, each non-volatile storage element 216, 218, 220 is comprised of multi-level cell ("MLC") devices.

In one embodiment, non-volatile storage elements that share a common line on the storage I/O bus 210a (e.g., 216b, 218b, 220b) are packaged together. In one embodiment, a non-volatile storage element 216, 218, 220 may have one or more dies per package with one or more packages stacked vertically and each die may be accessed independently. In another embodiment, a non-volatile storage element (e.g., SSS 0.0 216a) may have one or more virtual dies per die and one or more dies per package and one or more packages stacked vertically and each virtual die may be accessed independently. In another embodiment, a non-volatile storage element SSS 0.0 216a may have one or more virtual dies per die and one or more dies per package with some or all of the one or more dies stacked vertically and each virtual die may be accessed independently.

In one embodiment, two dies are stacked vertically with four stacks per group to form eight storage elements (e.g., SSS 0.0-SSS 8.0) 216a, 218a . . . 220a, each in a separate bank 214a, 214b . . . 214n. In another embodiment, 24 storage elements (e.g., SSS 0.0-SSS 0.24) 216a, 216b, . . . 216m form a logical bank 214a so that each of the eight logical banks has 24 storage elements (e.g., SSS0.0-SSS 8.24) 216, 218, 220. Data is sent to the non-volatile storage media 110 over the storage I/O bus 210 to all storage elements of a particular group of storage elements (SSS 0.0-SSS 8.0) 216a, 218a, 220a. The storage control bus 212a is used to select a particular bank (e.g., Bank 0 214a) so that the data received over the storage I/O bus 210 connected to all banks 214 is written just to the selected bank 214a.

In one embodiment, the storage I/O bus 210 is comprised of one or more independent I/O buses ("IIOBa-m" comprising 210a.a-m . . . 210n.a-m) wherein the non-volatile storage elements within each column share one of the independent I/O buses that are connected to each non-volatile storage element 216, 218, 220 in parallel. For example, one independent I/O bus 210a.a of the storage I/O bus 210a may be physically connected to a first non-volatile storage element 216a, 218a, 220a of each bank 214a-n. A second independent I/O bus 210a.b of the storage I/O bus 210b may be physically connected to a second non-volatile storage element 216b, 218b, 220b of each bank 214a-n. Each non-volatile storage element 216a, 216b, 216m in a bank 214a (a row of non-volatile storage elements as illustrated in FIG. 2) may be accessed simultaneously and/or in parallel. In one embodiment, where non-volatile storage elements 216, 218, 220 comprise stacked packages of dies, all packages in a particular stack are physically connected to the same independent I/O bus. As used herein, "simultaneously" also includes near simultaneous access where devices are accessed at slightly different intervals to avoid switching noise. Simultaneously is used in this context to be distinguished from a sequential or serial access wherein commands and/or data are sent individually one after the other.

Typically, banks 214*a-n* are independently selected using the storage control bus 212. In one embodiment, a bank 214 is selected using a chip enable or chip select. Where both chip select and chip enable are available, the storage control bus 212 may select one package within a stack of packages. In other embodiments, other commands are used by the storage control bus 212 to individually select one package within a stack of packages. Non-volatile storage elements 216, 218, 220 may also be selected through a combination of control signals and address information transmitted on storage I/O bus 210 and the storage control bus 212.

In one embodiment, each non-volatile storage element 216, 218, 220 is partitioned into erase blocks and each erase block is partitioned into pages. An erase block on a non-volatile storage element 216, 218 220 may be called a physical erase block or "PEB." A typical page is 2048 bytes ("2 kB"). In one example, a non-volatile storage element (e.g., SSS 0.0) includes two registers and can program two pages so that a two-register non-volatile storage element 216, 218, 220 has a capacity of 4 kB. A bank 214 of 20 non-volatile storage elements 216*a*, 216*b*, 216*m* would then have an 80 kB capacity of pages accessed with the same address going out the independent I/O buses of the storage I/O bus 210.

This group of pages in a bank 214 of non-volatile storage elements 216*a*, 216*b*, . . . 216*m* of 80 kB may be called a logical page or virtual page. Similarly, an erase block of each storage element 216*a*, 216*b*, . . . 216*m* of a bank 214*a* may be grouped to form a logical erase block (which may also be called a virtual erase block). In one embodiment, an erase block of pages within a non-volatile storage element is erased when an erase command is received within the non-volatile storage element. Whereas the size and number of erase blocks, pages, planes, or other logical and physical divisions within a non-volatile storage element 216, 218, 220 are expected to change over time with advancements in technology, it is to be expected that many embodiments consistent with new configurations are possible and are consistent with the general description herein.

Typically, when a packet is written to a particular location within a non-volatile storage element 216, wherein the packet is intended to be written to a location within a particular page which is specific to a particular physical erase block of a particular storage element of a particular bank, a physical address is sent on the storage I/O bus 210 and is followed by the packet. The physical address contains enough information for the non-volatile storage element 216 to direct the packet to the designated location within the page. Since all storage elements in a column of storage elements (e.g., SSS 0.0-SSS N.0 216*a*, 218*a*, . . . 220*a*) are connected to the same independent I/O bus (e.g., 210.*a.a*) of the storage I/O bus 210*a*, to reach the proper page and to avoid writing the data packet to similarly addressed pages in the column of storage elements (SSS 0.0-SSS N.0 216*a*, 218*a*, . . . 220*a*), the bank 214*a* that includes the non-volatile storage element SSS 0.0 216*a* with the correct page where the data packet is to be written is selected by the storage control bus 212*a* and other banks 214*b* . . . 214*n* of the non-volatile storage 110*a* are deselected.

Similarly, satisfying a read command on the storage I/O bus 210 requires a signal on the storage control bus 212 to select a single bank 214*a* and the appropriate page within that bank 214*a*. In one embodiment, a read command reads an entire page, and because there are multiple non-volatile storage elements 216*a*, 216*b*, . . . 216*m* in parallel in a bank 214*a*, an entire logical page is read with a read command. However, the read command may be broken into subcommands, as will be explained below with respect to bank interleave. Similarly, an entire logical page may be written to the non-volatile storage elements 216*a*, 216*b*, . . . 216*m* of a bank 214*a* in a write operation.

An erase block erase command may be sent out to erase an erase block over the storage I/O bus 210 with a particular erase block address to erase a particular erase block. Typically, storage controller 104*a* may send an erase block erase command over the parallel paths (independent I/O buses 210*a-n.a-m*) of the storage I/O bus 210 to erase a logical erase block, each with a particular erase block address to erase a particular erase block. Simultaneously, a particular bank (e.g., Bank 0 214*a*) is selected over the storage control bus 212 to prevent erasure of similarly addressed erase blocks in non-selected banks (e.g., Banks 1-N 214*b-n*). Alternatively, no particular bank (e.g., Bank 0 214*a*) is selected over the storage control bus 212 (or all of the banks are selected) to enable erasure of similarly addressed erase blocks in all of the banks (Banks 1-N 214*b-n*) in parallel. Other commands may also be sent to a particular location using a combination of the storage I/O bus 210 and the storage control bus 212. One of skill in the art will recognize other ways to select a particular storage location using the bi-directional storage I/O bus 210 and the storage control bus 212.

In one embodiment, packets are written sequentially to the non-volatile storage media 110. For example, storage controller 104*a* streams packets to storage write buffers of a bank 214*a* of storage elements 216 and, when the buffers are full, the packets are programmed to a designated logical page. Storage controller 104*a* then refills the storage write buffers with packets and, when full, the packets are written to the next logical page. The next logical page may be in the same bank 214*a* or another bank (e.g., 214*b*). This process continues, logical page after logical page, typically until a logical erase block is filled. In another embodiment, the streaming may continue across logical erase block boundaries with the process continuing, logical erase block after logical erase block.

In a read, modify, write operation, data packets associated with requested data are located and read in a read operation. Data segments of the modified requested data that have been modified are not written to the location from which they are read. Instead, the modified data segments are again converted to data packets and then written sequentially to the next available location in the logical page currently being written. The index entries for the respective data packets are modified to point to the packets that contain the modified data segments. The entry or entries in the index for data packets associated with the same requested data that have not been modified will include pointers to original location of the unmodified data packets. Thus, if the original requested data is maintained, for example to maintain a previous version of the requested data, the original requested data will have pointers in the index to all data packets as originally written. The new requested data will have pointers in the index to some of the original data packets and pointers to the modified data packets in the logical page that is currently being written.

In a copy operation, the index includes an entry for the original requested data mapped to a number of packets stored in the non-volatile storage media 110. When a copy is made, a new copy of the requested data is created and a new entry is created in the index mapping the new copy of the requested data to the original packets. The new copy of the requested data is also written to the non-volatile storage media 110 with its location mapped to the new entry in the index. The new copy of the requested data packets may be used to identify the packets within the original requested data that are referenced in case changes have been made in the original requested data that have not been propagated to the copy of the requested data and the index is lost or corrupted.

Beneficially, sequentially writing packets facilitates a more even use of the non-volatile storage media 110 and allows the solid-storage device controller 202 to monitor storage hot spots and level usage of the various logical pages in the non-volatile storage media 110. Sequentially writing packets also facilitates a powerful, efficient garbage collection system, which is described in detail below. One of skill in the art will recognize other benefits of sequential storage of data packets.

In various embodiments, the non-volatile storage device controller 202 also includes a data bus 204, a local bus 206, a buffer controller 208, buffers 0-N 222*a-n*, a master controller 224, a direct memory access ("DMA") controller 226, a memory controller 228, a dynamic memory array 230, a static random memory array 232, a management controller 234, a management bus 236, a bridge 238 to a system bus 240, and miscellaneous logic 242, which are described below. In other embodiments, the system bus 240 is coupled to one or more network interface cards ("NICs") 244, some of which may include remote DMA ("RDMA") controllers 246, one or more central processing unit ("CPU") 248, one or more external memory controllers 250 and associated external memory arrays 252, one or more storage controllers 254, peer controllers 256, and application specific processors 258, which are described below. The components 244-258 connected to the system bus 240 may be located in the host computing system 114 or may be located in other devices.

Typically, the storage controller(s) 104 communicate data to the non-volatile storage media 110 over a storage I/O bus 210. In a typical embodiment where the non-volatile storage is arranged in banks 214 and each bank 214 includes multiple storage elements 216*a*, 216*b*, 216*m* accessed in parallel, the storage I/O bus 210 is an array of busses, one for each column of storage elements 216, 218, 220 spanning the banks 214. As used herein, the term "storage I/O bus" may refer to one storage I/O bus 210 or an array of independent data busses wherein individual data busses of the array independently communicate different data relative to one another. In one embodiment, each storage I/O bus 210 accessing a column of storage elements (e.g., 216*a*, 218*a*, 220*a*) may include a logical-to-physical mapping for storage divisions (e.g., erase blocks) accessed in a column of storage elements 216*a*, 218*a*, 220*a*. This mapping (or bad block remapping) allows a logical address mapped to a physical address of a storage division to be remapped to a different storage division if the first storage division fails, partially fails, is inaccessible, or has some other problem.

Data may also be communicated to the storage controller(s) 104 from a requesting device through the system bus 240, bridge 238, local bus 206, buffer(s) 222, and finally over a data bus 204. The data bus 204 typically is connected to one or more buffers 222*a-n* controlled with a buffer controller 208. The buffer controller 208 typically controls transfer of data from the local bus 206 to the buffers 222 and through the data bus 204 to the pipeline input buffer 306 and output buffer 330. The buffer controller 208 typically controls how data arriving from a requesting device can be temporarily stored in a buffer 222 and then transferred onto a data bus 204, or vice versa, to account for different clock domains, to prevent data collisions, etc. The buffer controller 208 typically works in conjunction with the master controller 224 to coordinate data flow. As data arrives, the data will arrive on the system bus 240, be transferred to the local bus 206 through a bridge 238.

Typically, the data is transferred from the local bus 206 to one or more data buffers 222 as directed by the master controller 224 and the buffer controller 208. The data then flows out of the buffer(s) 222 to the data bus 204, through a non-volatile controller 104, and on to the non-volatile storage media 110 such as NAND flash or other storage media. In one embodiment, data and associated out-of-band metadata ("metadata") arriving with the data is communicated using one or more data channels comprising one or more storage controllers 104*a*-104*n*-1 and associated non-volatile storage media 110*a*-110*n*-1 while at least one channel (storage controller 104*n*, non-volatile storage media 110*n*) is dedicated to in-band metadata, such as index information and other metadata generated internally to the non-volatile storage device 102.

The local bus 206 is typically a bidirectional bus or set of busses that allows for communication of data and commands between devices internal to the non-volatile storage device controller 202 and between devices internal to the non-volatile storage device 102 and devices 244-258 connected to the system bus 240. The bridge 238 facilitates communication between the local bus 206 and system bus 240. One of skill in the art will recognize other embodiments such as ring structures or switched star configurations and functions of buses 240, 206, 204, 210 and bridges 238.

The system bus 240 is typically a bus of a host computing system 114 or other device in which the non-volatile storage device 102 is installed or connected. In one embodiment, the system bus 240 may be a PCI-e bus, a Serial Advanced Technology Attachment ("serial ATA") bus, parallel ATA, or the like. In another embodiment, the system bus 240 is an external bus such as small computer system interface ("SCSI"), FireWire, Fiber Channel, USB, PCIe-AS, or the like. The non-volatile storage device 102 may be packaged to fit internally to a device or as an externally connected device.

The non-volatile storage device controller 202 includes a master controller 224 that controls higher-level functions within the non-volatile storage device 102. The master controller 224, in various embodiments, controls data flow by interpreting object requests and other requests, directs creation of indexes to map object identifiers associated with data to physical locations of associated data, coordinating DMA requests, etc. Many of the functions described herein are controlled wholly or in part by the master controller 224.

In one embodiment, the master controller 224 uses embedded controller(s). In another embodiment, the master controller 224 uses local memory such as a dynamic memory array 230 (dynamic random access memory "DRAM"), a static memory array 232 (static random access memory "SRAM"), etc. In one embodiment, the local memory is controlled using the master controller 224. In another embodiment, the master controller 224 accesses the local memory via a memory controller 228. In another embodiment, the master controller 224 runs a Linux server and may support various common server interfaces, such as the World Wide Web, hyper-text markup language ("HTML"), etc. In another embodiment, the master controller 224 uses a nano-processor. The master controller 224 may be constructed using programmable or standard logic, or any combination of controller types listed above. One skilled in the art will recognize many embodiments for the master controller 224.

In one embodiment, where the non-volatile storage device controller 202 manages multiple data non-volatile storage media 110a-n, the master controller 224 divides the work load among internal controllers, such as the storage controllers 104a-n. For example, the master controller 224 may divide an object to be written to the data storage devices (e.g., non-volatile storage media 110a-n) so that a portion of the object is stored on each of the attached data storage devices. This feature is a performance enhancement allowing quicker storage and access to an object. In one embodiment, the master controller 224 is implemented using an FPGA. In another embodiment, the firmware within the master controller 224 may be updated through the management bus 236, the system bus 240 over a network connected to a NIC 244 or other device connected to the system bus 240.

In one embodiment, the master controller 224, which manages objects, emulates block storage such that a host computing system 114 or other device connected to the non-volatile storage device 102 views the non-volatile storage device 102 as a block storage device and sends data to specific physical addresses in the non-volatile storage device 102. The master controller 224 then divides up the blocks and stores the data blocks as it would objects. The master controller 224 then maps the blocks and physical address sent with the block to the actual locations determined by the master controller 224. The mapping is stored in the object index. Typically, for block emulation, a block device application program interface ("API") is provided in a driver in a computer such as the host computing system 114, or other device wishing to use the non-volatile storage device 102 as a block storage device.

In another embodiment, the master controller 224 coordinates with NIC controllers 244 and embedded RDMA controllers 246 to deliver just-in-time RDMA transfers of data and command sets. NIC controller 244 may be hidden behind a non-transparent port to enable the use of custom drivers. Also, a driver on a host computing system 114 may have access to the computer network 116 through an I/O memory driver using a standard stack API and operating in conjunction with NICs 244.

In one embodiment, the master controller 224 is also a redundant array of independent drive ("RAID") controller. Where the non-volatile storage device 102 is networked with one or more other non-volatile storage devices 102, the master controller 224 may be a RAID controller for single tier RAID, multi-tier RAID, progressive RAID, etc. The master controller 224 also allows some objects to be stored in a RAID array and other objects to be stored without RAID. In another embodiment, the master controller 224 may be a distributed RAID controller element. In another embodiment, the master controller 224 may comprise many RAID, distributed RAID, and other functions as described elsewhere. In one embodiment, the master controller 224 controls storage of data in a RAID-like structure where parity information is stored in one or more storage elements 216, 218, 220 of a logical page where the parity information protects data stored in the other storage elements 216, 218, 220 of the same logical page.

In one embodiment, the master controller 224 coordinates with single or redundant network managers (e.g., switches) to establish routing, to balance bandwidth utilization, failover, etc. In another embodiment, the master controller 224 coordinates with integrated application specific logic (via local bus 206) and associated driver software. In another embodiment, the master controller 224 coordinates with attached application specific processors 258 or logic (via the external system bus 240) and associated driver software. In another embodiment, the master controller 224 coordinates with remote application specific logic (via the computer network 116) and associated driver software. In another embodiment, the master controller 224 coordinates with the local bus 206 or external bus attached hard disk drive ("HDD") storage controller.

In one embodiment, the master controller 224 communicates with one or more storage controllers 254 where the storage device/non-volatile storage device 102 may appear as a storage device connected through a SCSI bus, Internet SCSI ("iSCSI"), fiber channel, etc. Meanwhile the storage device/non-volatile storage device 102 may autonomously manage objects and may appear as an object file system or distributed object file system. The master controller 224 may also be accessed by peer controllers 256 and/or application specific processors 258.

In another embodiment, the master controller 224 coordinates with an autonomous integrated management controller to periodically validate FPGA code and/or controller software, validate FPGA code while running (reset) and/or validate controller software during power on (reset), support external reset requests, support reset requests due to watchdog timeouts, and support voltage, current, power, temperature, and other environmental measurements and setting of threshold interrupts. In another embodiment, the master controller 224 manages garbage collection to free erase blocks for reuse. In another embodiment, the master controller 224 manages wear leveling. In another embodiment, the master controller 224 allows the data storage device/non-volatile storage device 102 to be partitioned into multiple logical devices and allows partition-based media encryption. In yet another embodiment, the master controller 224 supports a storage controller 202 with advanced, multi-bit ECC correction. One of skill in the art will recognize other features and functions of a master controller 224 in a storage controller 202, or more specifically in a non-volatile storage device 102.

In one embodiment, the non-volatile storage device controller 202 includes a memory controller 228, which controls a dynamic random memory array 230 and/or a static random memory array 232. As stated above, the memory controller 228 may be independent or integrated with the master controller 224. The memory controller 228 typically controls volatile memory of some type, such as DRAM (dynamic random memory array 230) and SRAM (static random memory array 232). In other examples, the memory controller 228 also controls other memory types such as electrically erasable programmable read only memory ("EEPROM"), etc. In other embodiments, the memory controller 228 controls two or more memory types and the memory controller 228 may include more than one controller. Typically, the memory controller 228 controls as much SRAM 232 as is feasible and by DRAM 230 to supplement the SRAM 232.

In one embodiment, the object index is stored in memory 230, 232 and then periodically off-loaded to a channel of the non-volatile storage media 110n or other non-volatile memory. One of skill in the art will recognize other uses and configurations of the memory controller 228, dynamic memory array 230, and static memory array 232.

In one embodiment, the non-volatile storage device controller 202 includes a DMA controller 226 that controls DMA operations between the non-volatile storage device 102 and one or more external memory controllers 250 and associated external memory arrays 252 and CPUs 248. Note that the external memory controllers 250 and external memory arrays 252 are called external because they are external to the non-volatile storage device 102. In addition, the DMA controller 226 may also control RDMA operations with requesting devices through a NIC 244 and associated RDMA controller 246.

In one embodiment, the non-volatile storage device controller 202 includes a management controller 234 connected to a management bus 236. Typically, the management controller 234 manages environmental metrics and status of the non-volatile storage device 102. The management controller 234 may monitor device temperature, fan speed, power supply settings, etc. over the management bus 236. The management controller 234 may support the reading and programming of erasable programmable read only memory ("EEPROM") for storage of FPGA code and controller software. Typically, the management bus 236 is connected to the various components within the non-volatile storage device 102. The management controller 234 may communicate alerts, interrupts, etc. over the local bus 206 or may include a separate connection to a system bus 240 or other bus. In one embodiment, the management bus 236 is an Inter-Integrated Circuit ("I2C") bus. One of skill in the art will recognize other related functions and uses of a management controller 234 connected to components of the non-volatile storage device 102 by a management bus 236.

In one embodiment, the non-volatile storage device controller 202 includes miscellaneous logic 242 that may be customized for a specific application. Typically, where the non-volatile device controller 202 or master controller 224 is/are configured using a FPGA or other configurable controller, custom logic may be included based on a particular application, customer requirement, storage requirement, etc.

Figure 3:
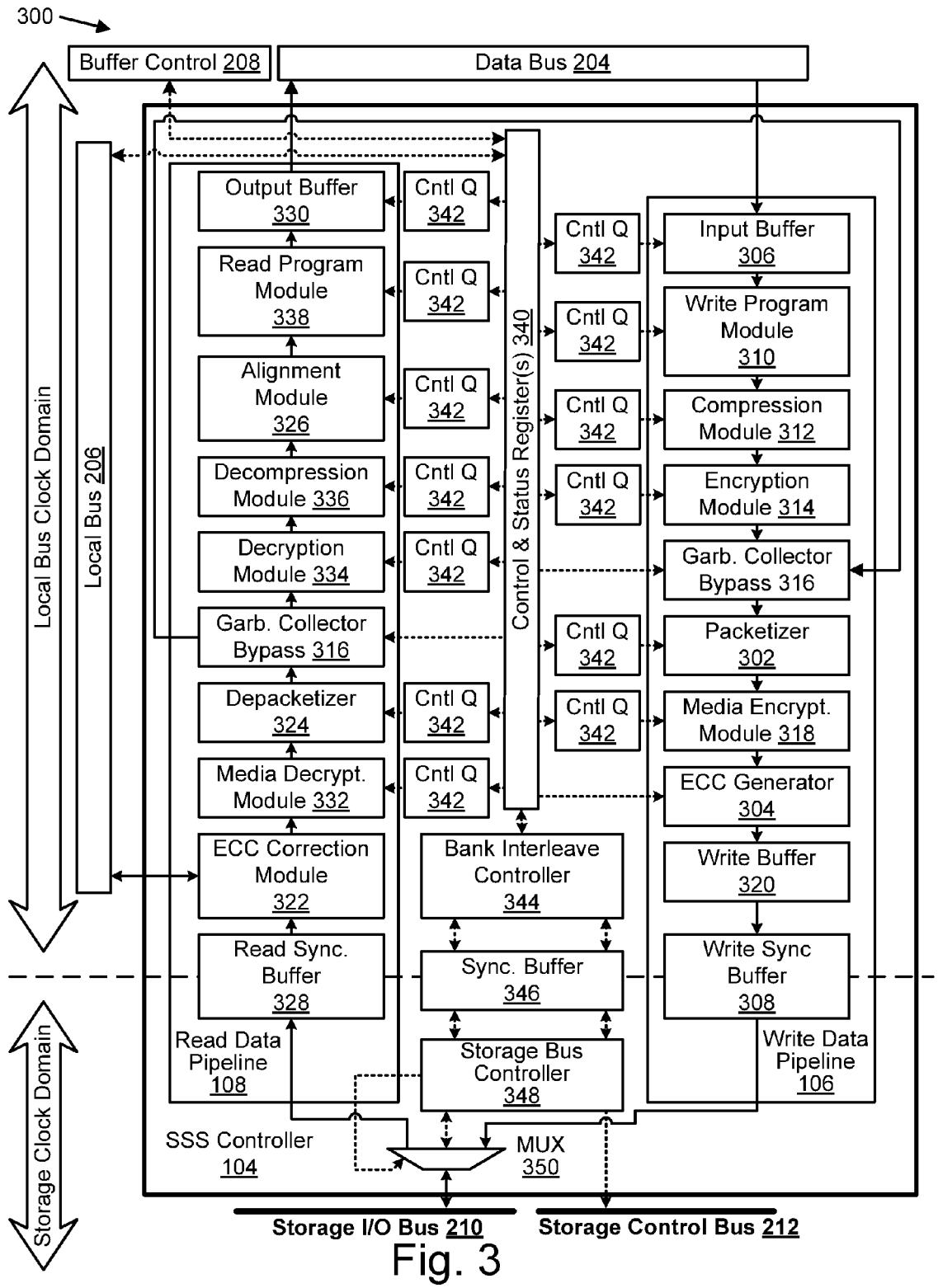
FIG. 3 is a block diagram of one embodiment of a storage controller comprising a write data pipeline and a read data pipeline.

FIG. 3 is a schematic block diagram illustrating one embodiment 300 of a storage controller 104 with a write data pipeline 106 and a read data pipeline 108 in a non-volatile storage device 102 in accordance with the present invention. The embodiment 300 includes a data bus 204, a local bus 206, and buffer control 208, which are substantially similar to those described in relation to the non-volatile storage device controller 202 of FIG. 2. The write data pipeline 106 includes a packetizer 302 and an error-correcting code ("ECC") generator 304. In other embodiments, the write data pipeline 106 includes an input buffer 306, a write synchronization buffer 308, a write program module 310, a compression module 312, an encryption module 314, a garbage collector bypass 316 (with a portion within the read data pipeline 108), a media encryption module 318, and a write buffer 320. The read data pipeline 108 includes a read synchronization buffer 328, an ECC correction module 322, a depacketizer 324, an alignment module 326, and an output buffer 330. In other embodiments, the read data pipeline 108 may include a media decryption module 332, a portion of the garbage collector bypass 316, a decryption module 334, a decompression module 336, and a read program module 338. The storage controller 104 may also include control and status registers 340 and control queues 342, a bank interleave controller 344, a synchronization buffer 346, a storage bus controller 348, and a multiplexer ("MUX") 350. The components of the non-volatile controller 104 and associated write data pipeline 106 and read data pipeline 108 are described below. In other embodiments, non-volatile storage media 110 may be used and synchronization buffers 308 and 328 may be eliminated.

The write data pipeline 106 includes a packetizer 302 that receives a data or metadata segment to be written to the non-volatile storage, either directly or indirectly through another write data pipeline 106 stage, and creates one or more packets sized for the non-volatile storage media 110. The data or metadata segment is typically part of a data structure such as an object, but may also include an entire data structure. In another embodiment, the data segment is part of a block of data, but may also include an entire block of data. Typically, a set of data such as a data structure is received from a computer such as the host computing system 114, or other computer or device and is transmitted to the non-volatile storage device 102 in data segments streamed to the non-volatile storage device 102. A data segment may also be known by another name, such as data parcel, but as referenced herein includes all or a portion of a data structure or data block.

Each data structure is stored as one or more packets. Each data structure may have one or more container packets. Each packet contains a header. The header may include a header type field. Type fields may include data, attribute, metadata, data segment delimiters (multi-packet), data structures, data linkages, and the like. The header may also include information regarding the size of the packet, such as the number of bytes of data included in the packet. The length of the packet may be established by the packet type. The header may include information that establishes the relationship of the packet to a data structure. An example might be the use of an offset in a data packet header to identify the location of the data segment within the data structure. One of skill in the art will recognize other information that may be included in a header added to data by a packetizer 302 and other information that may be added to a data packet.

Each packet includes a header and possibly data from the data or metadata segment. The header of each packet includes pertinent information to relate the packet to the data structure to which the packet belongs. For example, the header may include an object identifier or other data structure identifier and offset that indicate the data segment, object, data structure or data block from which the data packet was formed. The header may also include a logical address used by the storage bus controller 348 to store the packet. The header may also include information regarding the size of the packet, such as the number of bytes included in the packet. The header may also include a sequence number that identifies where the data segment belongs with respect to other packets within the data structure when reconstructing the data segment or data structure. The header may include a header type field. Type fields may include data, data structure attributes, metadata, data segment delimiters (multi-packet), data structure types, data structure linkages, and the like. One of skill in the art will recognize other information that may be included in a header added to data or metadata by a packetizer 302 and other information that may be added to a packet.

The write data pipeline 106 includes an ECC generator 304 that that generates one or more error-correcting codes ("ECC") for the one or more packets received from the packetizer 302. The ECC generator 304 typically uses an error-correcting algorithm to generate ECC check bits, which are stored with the one or more data packets. The ECC codes generated by the ECC generator 304 together with the one or more data packets associated with the ECC codes comprise an ECC chunk. The ECC data stored with the one or more data packets is used to detect and to correct errors introduced into the data through transmission and storage. In one embodiment, packets are streamed into the ECC generator 304 as un-encoded blocks of length N. A syndrome of length S is calculated, appended, and output as an encoded block of length N+S. The value of N and S are dependent upon the characteristics of the ECC algorithm, which is selected to achieve specific performance, efficiency, and robustness metrics. In one embodiment, there is no fixed relationship between the ECC blocks and the packets; the packet may comprise more than one ECC block; the ECC block may comprise more than one packet; and a first packet may end anywhere within the ECC block and a second packet may begin after the end of the first packet within the same ECC block. In one embodiment, ECC algorithms are not dynamically modified. In one embodiment, the ECC data stored with the data packets is robust enough to correct errors in more than two bits.

Beneficially, using a robust ECC algorithm allowing more than single bit correction or even double bit correction allows the life of the non-volatile storage media 110 to be extended. For example, if flash memory is used as the storage medium in the non-volatile storage media 110, the flash memory may be written approximately 100,000 times without error per erase cycle. This usage limit may be extended using a robust ECC algorithm. Having the ECC generator 304 and corresponding ECC correction module 322 onboard the non-volatile storage device 102, the non-volatile storage device 102 can internally correct errors and has a longer useful life than if a less robust ECC algorithm is used, such as single bit correction. However, in other embodiments the ECC generator 304 may use a less robust algorithm and may correct single-bit or double-bit errors. In another embodiment, the non-volatile storage device 102 may comprise less reliable storage such as multi-level cell ("MLC") flash in order to increase capacity, where MLC storage may not be sufficiently reliable without more robust ECC algorithms.

In one embodiment, the write pipeline 106 includes an input buffer 306 that receives a data segment to be written to the non-volatile storage media 110 and stores the incoming data segments until the next stage of the write data pipeline 106, such as the packetizer 302 (or other stage for a more complex write data pipeline 106) is ready to process the next data segment. The input buffer 306 typically allows for discrepancies between the rate data segments are received and processed by the write data pipeline 106 using an appropriately sized data buffer. The input buffer 306 also allows the data bus 204 to transfer data to the write data pipeline 106 at rates greater than can be sustained by the write data pipeline 106 in order to improve efficiency of operation of the data bus 204. Typically, when the write data pipeline 106 does not include an input buffer 306, a buffering function is performed elsewhere, such as in the non-volatile storage device 102 but outside the write data pipeline 106, in the host computing system 114, such as within a network interface card ("NIC"), or at another device, for example when using remote direct memory access ("RDMA").

In another embodiment, the write data pipeline 106 also includes a write synchronization buffer 308 that buffers packets received from the ECC generator 304 prior to writing the packets to the non-volatile storage media 110. The write synchronization buffer 308 is located at a boundary between a local clock domain and a non-volatile storage clock domain and provides buffering to account for the clock domain differences. In other embodiments, synchronous non-volatile storage media 110 may be used and synchronization buffers 308 and 328 may be eliminated.

In one embodiment, the write data pipeline 106 also includes a media encryption module 318 that receives the one or more packets from the packetizer 302, either directly or indirectly, and encrypts the one or more packets using an encryption key unique to the non-volatile storage device 102 prior to sending the packets to the ECC generator 304. Typically, the entire packet is encrypted, including the headers. In another embodiment, headers are not encrypted. In this document, encryption key is understood to mean a secret encryption key that is managed externally from a storage controller 104.

The media encryption module 318 and corresponding media decryption module 332 provide a level of security for data stored in the non-volatile storage media 110. For example, where data is encrypted with the media encryption module 318, if the non-volatile storage media 110 is connected to a different storage controller 104, non-volatile storage device 102, or server, the contents of the non-volatile storage media 110 typically could not be read without use of the same encryption key used during the write of the data to the non-volatile storage media 110 without significant effort.

In a typical embodiment, the non-volatile storage device 102 does not store the encryption key in non-volatile storage and allows no external access to the encryption key. The encryption key is provided to the storage controller 104 during initialization. The non-volatile storage device 102 may use and store a non-secret cryptographic nonce that is used in conjunction with an encryption key. A different nonce may be stored with every packet. Data segments may be split between multiple packets with unique nonces for the purpose of improving protection by the encryption algorithm.

The encryption key may be received from a host computing system 114, a server, key manager, or other device that manages the encryption key to be used by the storage controller 104.

In another embodiment, the non-volatile storage media 110 may have two or more partitions and the storage controller 104 behaves as though it was two or more storage controllers 104, each operating on a single partition within the non-volatile storage media 110. In this embodiment, a unique media encryption key may be used with each partition.

In another embodiment, the write data pipeline 106 also includes an encryption module 314 that encrypts a data or metadata segment received from the input buffer 306, either directly or indirectly, prior sending the data segment to the packetizer 302, the data segment encrypted using an encryption key received in conjunction with the data segment. The encryption keys used by the encryption module 314 to encrypt data may not be common to all data stored within the non-volatile storage device 102 but may vary on an per data structure basis and received in conjunction with receiving data segments as described below. For example, an encryption key for a data segment to be encrypted by the encryption module 314 may be received with the data segment or may be received as part of a command to write a data structure to which the data segment belongs. The storage device 102 may use and store a non-secret cryptographic nonce in each data structure packet that is used in conjunction with the encryption key. A different nonce may be stored with every packet. Data segments may be split between multiple packets with unique nonces for the purpose of improving protection by the encryption algorithm.

The encryption key may be received from a host computing system 114, another computer, key manager, or other device that holds the encryption key to be used to encrypt the data segment. In one embodiment, encryption keys are transferred to the storage controller 104 from one of a non-volatile storage device 102, host computing system 114, computer, or other external agent, which has the ability to execute industry standard methods to securely transfer and protect private and public keys.

In one embodiment, the encryption module 314 encrypts a first packet with a first encryption key received in conjunction with the packet and encrypts a second packet with a second encryption key received in conjunction with the second packet. In another embodiment, the encryption module 314 encrypts a first packet with a first encryption key received in conjunction with the packet and passes a second data packet on to the next stage without encryption. Beneficially, the encryption module 314 included in the write data pipeline 106 of the non-volatile storage device 102 allows data structure-by-data structure or segment-by-segment data encryption without a single file system or other external system to keep track of the different encryption keys used to store corresponding data structures or data segments. Each requesting device or related key manager independently manages encryption keys used to encrypt only the data structures or data segments sent by the requesting device.

In one embodiment, the encryption module 314 may encrypt the one or more packets using an encryption key unique to the non-volatile storage device 102. The encryption module 314 may perform this media encryption independently, or in addition to the encryption described above. Typically, the entire packet is encrypted, including the headers. In another embodiment, headers are not encrypted. The media encryption by the encryption module 314 provides a level of security for data stored in the non-volatile storage media 110. For example, where data is encrypted with media encryption unique to the specific non-volatile storage device 102, if the non-volatile storage media 110 is connected to a different storage controller 104, non-volatile storage device 102, or host computing system 114, the contents of the non-volatile storage media 110 typically could not be read without use of the same encryption key used during the write of the data to the non-volatile storage media 110 without significant effort.

In another embodiment, the write data pipeline 106 includes a compression module 312 that compresses the data for metadata segment prior to sending the data segment to the packetizer 302. The compression module 312 typically compresses a data or metadata segment using a compression routine known to those of skill in the art to reduce the storage size of the segment. For example, if a data segment includes a string of 512 zeros, the compression module 312 may replace the 512 zeros with code or token indicating the 512 zeros where the code is much more compact than the space taken by the 512 zeros.

In one embodiment, the compression module 312 compresses a first segment with a first compression routine and passes along a second segment without compression. In another embodiment, the compression module 312 compresses a first segment with a first compression routine and compresses the second segment with a second compression routine. Having this flexibility within the non-volatile storage device 102 is beneficial so that computing systems 114 or other devices writing data to the non-volatile storage device 102 may each specify a compression routine or so that one can specify a compression routine while another specifies no compression. Selection of compression routines may also be selected according to default settings on a per data structure type or data structure class basis. For example, a first data structure of a specific data structure may be able to override default compression routine settings and a second data structure of the same data structure class and data structure type may use the default compression routine and a third data structure of the same data structure class and data structure type may use no compression.

In one embodiment, the write data pipeline 106 includes a garbage collector bypass 316 that receives data segments from the read data pipeline 108 as part of a data bypass in a garbage collection system. A garbage collection system (also referred to as a "groomer" or grooming operation) typically marks packets that are no longer valid, typically because the packet is marked for deletion or has been modified and the modified data is stored in a different location. At some point, the garbage collection system determines that a particular section (e.g., an erase block) of storage may be recovered. This determination may be due to a lack of available storage capacity, the percentage of data marked as invalid reaching a threshold, a consolidation of valid data, an error detection rate for that section of storage reaching a threshold, or improving performance based on data distribution, etc. Numerous factors may be considered by a garbage collection algorithm to determine when a section of storage is to be recovered.

Once a section of storage has been marked for recovery, valid packets in the section typically must be relocated. The garbage collector bypass 316 allows packets to be read into the read data pipeline 108 and then transferred directly to the write data pipeline 106 without being routed out of the storage controller 104. In one embodiment, the garbage collector bypass 316 is part of an autonomous garbage collector system that operates within the non-volatile storage device 102. This allows the non-volatile storage device 102 to manage data so that data is systematically spread throughout the non-volatile storage media 110 to improve performance, data reliability and to avoid overuse and underuse of any one location or area of the non-volatile storage media 110 and to lengthen the useful life of the non-volatile storage media 110.

The garbage collector bypass 316 coordinates insertion of segments into the write data pipeline 106 with other segments being written by computing systems 114 or other devices. In the depicted embodiment, the garbage collector bypass 316 is before the packetizer 302 in the write data pipeline 106 and after the depacketizer 324 in the read data pipeline 108, but may also be located elsewhere in the read and write data pipelines 106 and 108, respectively. The garbage collector bypass 316 may be used during a flush of the write pipeline 108 to fill the remainder of the logical page in order to improve the efficiency of storage within the non-volatile storage media 110 and thereby reduce the frequency of garbage collection.

Grooming may comprise refreshing data stored on the non-volatile storage media 110. Data stored on the non-volatile storage media 110 may degrade over time. The storage controller 104 may comprise a groomer that identifies "stale" data on the non-volatile storage device 102 (data that has not been modified and/or moved for a pre-determined time), and refreshes the stale data by re-writing the data to a different storage location.

In some embodiments, the garbage collection system, groomer, and/or garbage collection bypass 316 may be temporarily disabled to allow data to be stored contiguously on physical storage locations of the non-volatile storage device 102. Disabling the garbage collection system and/or bypass 316 may ensure that data in the write data pipeline 106 is not interleaved with other data. For example, and discussed below, garbage collection and/or the garbage collection bypass 316 may be disabled when storing data pertaining to an atomic storage request.

In some embodiments, the garbage collection and/or groomer may be restricted to a certain portion of the physical storage space of the non-volatile storage device. For example, storage metadata, such as the reverse index described below, may be periodically persisted to a non-volatile storage location. The garbage collection and/or grooming may be restricted to operating on portions of the non-volatile storage media that correspond to the persisted storage metadata.

In one embodiment, the write data pipeline 106 includes a write buffer 320 that buffers data for efficient write operations. Typically, the write buffer 320 includes enough capacity for packets to fill at least one logical page in the non-volatile storage media 110. This allows a write operation to send an entire logical page of data to the non-volatile storage media 110 without interruption. By sizing the write buffer 320 of the write data pipeline 106 and buffers within the read data pipeline 108 to be the same capacity or larger than a storage write buffer within the non-volatile storage media 110, writing and reading data is more efficient since a single write command may be crafted to send a full logical page of data to the non-volatile storage media 110 instead of multiple commands.

While the write buffer 320 is being filled, the non-volatile storage media 110 may be used for other read operations. This is advantageous because other non-volatile devices with a smaller write buffer or no write buffer may tie up the non-volatile storage when data is written to a storage write buffer and data flowing into the storage write buffer stalls. Read operations will be blocked until the entire storage write buffer is filled and programmed. Another approach for systems without a write buffer or a small write buffer is to flush the storage write buffer that is not full in order to enable reads. Again, this is inefficient because multiple write/program cycles are required to fill a page.

For depicted embodiment with a write buffer 320 sized larger than a logical page, a single write command, which includes numerous subcommands, can then be followed by a single program command to transfer the page of data from the storage write buffer in each non-volatile storage element 216, 218, 220 to the designated page within each non-volatile storage element 216, 218, 220. This technique has the benefits of eliminating partial page programming, which is known to reduce data reliability and durability and freeing up the destination bank for reads and other commands while the buffer fills.

In one embodiment, the write buffer 320 is a ping-pong buffer where one side of the buffer is filled and then designated for transfer at an appropriate time while the other side of the ping-pong buffer is being filled. In another embodiment, the write buffer 320 includes a first-in first-out ("FIFO") register with a capacity of more than a logical page of data segments. One of skill in the art will recognize other write buffer 320 configurations that allow a logical page of data to be stored prior to writing the data to the non-volatile storage media 110.

In another embodiment, the write buffer 320 is sized smaller than a logical page so that less than a page of information could be written to a storage write buffer in the non-volatile storage media 110. In the embodiment, to prevent a stall in the write data pipeline 106 from holding up read operations, data is queued using the garbage collection system that needs to be moved from one location to another as part of the garbage collection process. In case of a data stall in the write data pipeline 106, the data can be fed through the garbage collector bypass 316 to the write buffer 320 and then on to the storage write buffer in the non-volatile storage media 110 to fill the pages of a logical page prior to programming the data. In this way, a data stall in the write data pipeline 106 would not stall reading from the non-volatile storage device 102.

In another embodiment, the write data pipeline 106 includes a write program module 310 with one or more user-definable functions within the write data pipeline 106. The write program module 310 allows a user to customize the write data pipeline 106. A user may customize the write data pipeline 106 based on a particular data requirement or application. Where the storage controller 104 is an FPGA, the user may program the write data pipeline 106 with custom commands and functions relatively easily. A user may also use the write program module 310 to include custom functions with an ASIC, however, customizing an ASIC may be more difficult than with an FPGA. The write program module 310 may include buffers and bypass mechanisms to allow a first data segment to execute in the write program module 310 while a second data segment may continue through the write data pipeline 106. In another embodiment, the write program module 310 may include a processor core that can be programmed through software.

Note that the write program module 310 is shown between the input buffer 306 and the compression module 312, however, the write program module 310 could be anywhere in the write data pipeline 106 and may be distributed among the various stages 302-320. In addition, there may be multiple write program modules 310 distributed among the various states 302-320 that are programmed and operate independently. In addition, the order of the stages 302-320 may be altered. One of skill in the art will recognize workable alterations to the order of the stages 302-320 based on particular user requirements.

The read data pipeline 108 includes an ECC correction module 322 that determines if a data error exists in ECC blocks a requested packet received from the non-volatile storage media 110 by using ECC stored with each ECC block of the requested packet. The ECC correction module 322 then corrects any errors in the requested packet if any error exists and the errors are correctable using the ECC. For example, if the ECC can detect an error in six bits but can only correct three bit errors, the ECC correction module 322 corrects ECC blocks of the requested packet with up to three bits in error. The ECC correction module 322 corrects the bits in error by changing the bits in error to the correct one or zero state so that the requested data packet is identical to when it was written to the non-volatile storage media 110 and the ECC was generated for the packet.

If the ECC correction module 322 determines that the requested packets contains more bits in error than the ECC can correct, the ECC correction module 322 cannot correct the errors in the corrupted ECC blocks of the requested packet and sends an interrupt. In one embodiment, the ECC correction module 322 sends an interrupt with a message indicating that the requested packet is in error. The message may include information that the ECC correction module 322 cannot correct the errors or the inability of the ECC correction module 322 to correct the errors may be implied. In another embodiment, the ECC correction module 322 sends the corrupted ECC blocks of the requested packet with the interrupt and/or the message.

In one embodiment, a corrupted ECC block or portion of a corrupted ECC block of the requested packet that cannot be corrected by the ECC correction module 322 is read by the master controller 224, corrected, and returned to the ECC correction module 322 for further processing by the read data pipeline 108. In one embodiment, a corrupted ECC block or portion of a corrupted ECC block of the requested packet is sent to the device requesting the data. The requesting device 155 may correct the ECC block or replace the data using another copy, such as a backup or mirror copy, and then may use the replacement data of the requested data packet or return it to the read data pipeline 108. The requesting device 155 may use header information in the requested packet in error to identify data required to replace the corrupted requested packet or to replace the data structure to which the packet belongs. In another embodiment, the storage controller 104 stores data using some type of RAID and is able to recover the corrupted data. In another embodiment, the ECC correction module 322 sends an interrupt and/or message and the receiving device fails the read operation associated with the requested data packet. One of skill in the art will recognize other options and actions to be taken as a result of the ECC correction module 322 determining that one or more ECC blocks of the requested packet are corrupted and that the ECC correction module 322 cannot correct the errors.

The read data pipeline 108 includes a depacketizer 324 that receives ECC blocks of the requested packet from the ECC correction module 322, directly or indirectly, and checks and removes one or more packet headers. The depacketizer 324 may validate the packet headers by checking packet identifiers, data length, data location, etc. within the headers. In one embodiment, the header includes a hash code that can be used to validate that the packet delivered to the read data pipeline 108 is the requested packet. The depacketizer 324 also removes the headers from the requested packet added by the packetizer 302. The depacketizer 324 may directed to not operate on certain packets but pass these forward without modification. An example might be a container label that is requested during the course of a rebuild process where the header information is required for index reconstruction. Further examples include the transfer of packets of various types destined for use within the non-volatile storage device 102. In another embodiment, the depacketizer 324 operation may be packet type dependent.

The read data pipeline 108 includes an alignment module 326 that receives data from the depacketizer 324 and removes unwanted data. In one embodiment, a read command sent to the non-volatile storage media 110 retrieves a packet of data. A device requesting the data may not require all data within the retrieved packet and the alignment module 326 removes the unwanted data. If all data within a retrieved page is requested data, the alignment module 326 does not remove any data.

The alignment module 326 re-formats the data as data segments of a data structure in a form compatible with a device requesting the data segment prior to forwarding the data segment to the next stage. Typically, as data is processed by the read data pipeline 108, the size of data segments or packets changes at various stages. The alignment module 326 uses received data to format the data into data segments suitable to be sent to the requesting device 155 and joined to form a response. For example, data from a portion of a first data packet may be combined with data from a portion of a second data packet. If a data segment is larger than a data requested by the requesting device 155, the alignment module 326 may discard the unwanted data.

In one embodiment, the read data pipeline 108 includes a read synchronization buffer 328 that buffers one or more requested packets read from the non-volatile storage media 110 prior to processing by the read data pipeline 108. The read synchronization buffer 328 is at the boundary between the non-volatile storage clock domain and the local bus clock domain and provides buffering to account for the clock domain differences.

In another embodiment, the read data pipeline 108 includes an output buffer 330 that receives requested packets from the alignment module 326 and stores the packets prior to transmission to the requesting device 155. The output buffer 330 accounts for differences between when data segments are received from stages of the read data pipeline 108 and when the data segments are transmitted to other parts of the storage controller 104 or to the requesting device 155. The output buffer 330 also allows the data bus 204 to receive data from the read data pipeline 108 at rates greater than can be sustained by the read data pipeline 108 in order to improve efficiency of operation of the data bus 204.

In one embodiment, the read data pipeline 108 includes a media decryption module 332 that receives one or more encrypted requested packets from the ECC correction module 322 and decrypts the one or more requested packets using the encryption key unique to the non-volatile storage device 102 prior to sending the one or more requested packets to the depacketizer 324. Typically, the encryption key used to decrypt data by the media decryption module 332 is identical to the encryption key used by the media encryption module 318. In another embodiment, the non-volatile storage media 110 may have two or more partitions and the storage controller 104 behaves as though it was two or more storage controllers 104 each operating on a single partition within the non-volatile storage media 110. In this embodiment, a unique media encryption key may be used with each partition.

In another embodiment, the read data pipeline 108 includes a decryption module 334 that decrypts a data segment formatted by the depacketizer 324 prior to sending the data segment to the output buffer 330. The data segment may be decrypted using an encryption key received in conjunction with the read request that initiates retrieval of the requested packet received by the read synchronization buffer 328. The decryption module 334 may decrypt a first packet with an encryption key received in conjunction with the read request for the first packet and then may decrypt a second packet with a different encryption key or may pass the second packet on to the next stage of the read data pipeline 108 without decryption. When the packet was stored with a non-secret cryptographic nonce, the nonce is used in conjunction with an encryption key to decrypt the data packet. The encryption key may be received from a host computing system 114, a client, key manager, or other device that manages the encryption key to be used by the storage controller 104.

In another embodiment, the read data pipeline 108 includes a decompression module 336 that decompresses a data segment formatted by the depacketizer 324. In one embodiment, the decompression module 336 uses compression information stored in one or both of the packet header and the container label to select a complementary routine to that used to compress the data by the compression module 312. In another embodiment, the decompression routine used by the decompression module 336 is dictated by the device requesting the data segment being decompressed. In another embodiment, the decompression module 336 selects a decompression routine according to default settings on a per data structure type or data structure class basis. A first packet of a first object may be able to override a default decompression routine and a second packet of a second data structure of the same data structure class and data structure type may use the default decompression routine and a third packet of a third data structure of the same data structure class and data structure type may use no decompression.

In another embodiment, the read data pipeline 108 includes a read program module 338 that includes one or more user-definable functions within the read data pipeline 108. The read program module 338 has similar characteristics to the write program module 310 and allows a user to provide custom functions to the read data pipeline 108. The read program module 338 may be located as shown in FIG. 3, may be located in another position within the read data pipeline 108, or may include multiple parts in multiple locations within the read data pipeline 108. Additionally, there may be multiple read program modules 338 within multiple locations within the read data pipeline 108 that operate independently. One of skill in the art will recognize other forms of a read program module 338 within a read data pipeline 108. As with the write data pipeline 106, the stages of the read data pipeline 108 may be rearranged and one of skill in the art will recognize other orders of stages within the read data pipeline 108.

The storage controller 104 includes control and status registers 340 and corresponding control queues 342. The control and status registers 340 and control queues 342 facilitate control and sequencing commands and subcommands associated with data processed in the write and read data pipelines 106, 108. For example, a data segment in the packetizer 302 may have one or more corresponding control commands or instructions in a control queue 342 associated with the ECC generator 304. As the data segment is packetized, some of the instructions or commands may be executed within the packetizer 302. Other commands or instructions may be passed to the next control queue 342 through the control and status registers 340 as the newly formed data packet created from the data segment is passed to the next stage.

Commands or instructions may be simultaneously loaded into the control queues 342 for a packet being forwarded to the write data pipeline 106 with each pipeline stage pulling the appropriate command or instruction as the respective packet is executed by that stage. Similarly, commands or instructions may be simultaneously loaded into the control queues 342 for a packet being requested from the read data pipeline 108 with each pipeline stage pulling the appropriate command or instruction as the respective packet is executed by that stage. One of skill in the art will recognize other features and functions of control and status registers 340 and control queues 342.

The storage controller 104 and or non-volatile storage device 102 may also include a bank interleave controller 344, a synchronization buffer 346, a storage bus controller 348, and a multiplexer ("MUX") 350.

Figure 4:
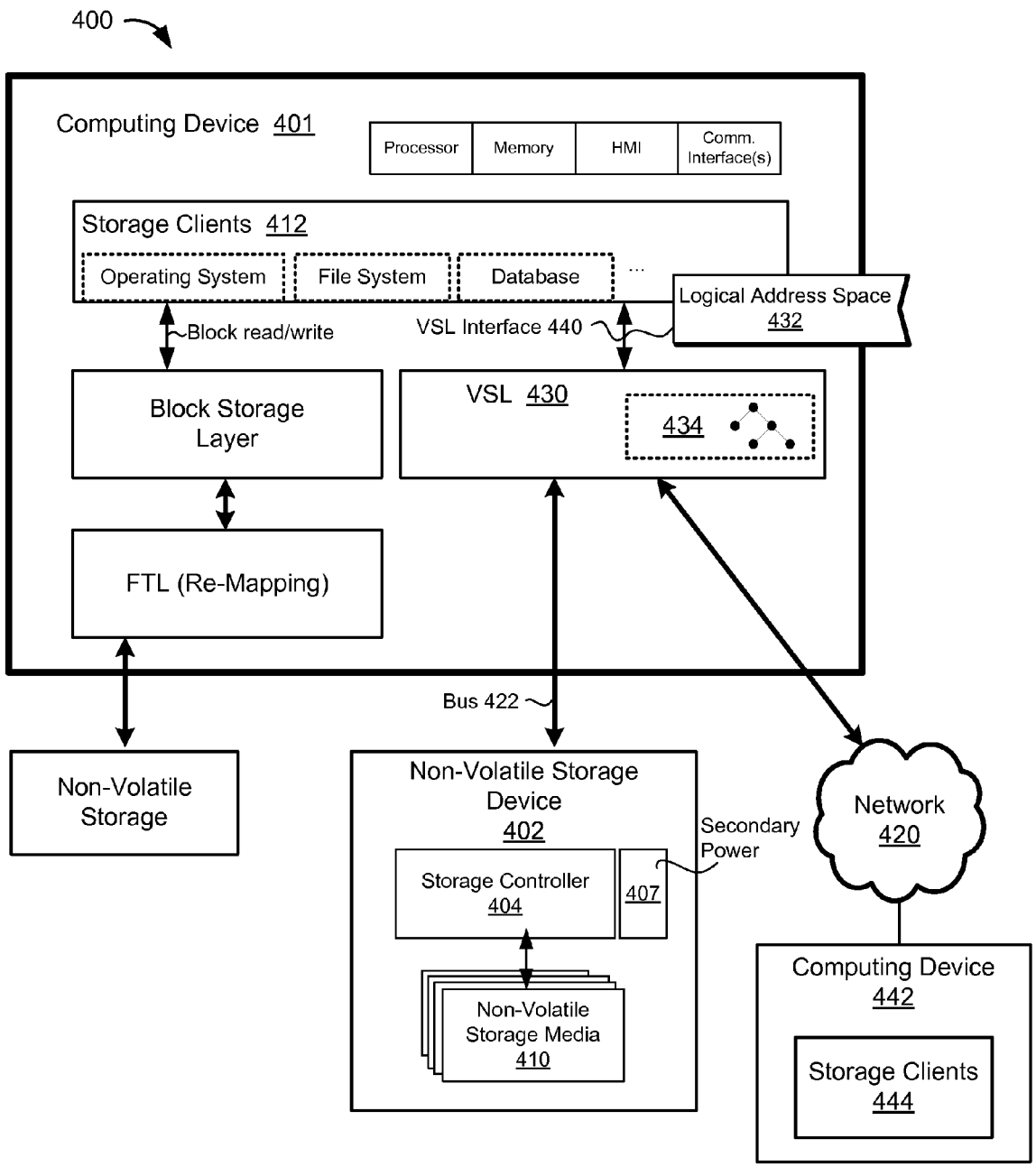
FIG. 4 is a block diagram of one embodiment of a system comprising a virtual storage layer.

In some embodiments, a virtual storage layer provides an interface through which storage clients perform persistent operations. The virtual storage layer may simplify data storage operations for storage clients and expose enhanced storage features, such as atomicity, transactional support, recovery, and so on. FIG. 4 depicts one embodiment of a system comprising a virtual storage layer (VSL) 430 that presents a logical address space 432 of the non-volatile storage device 402 to storage clients 412 operating on a computing device 401. The computing device 401 may comprise a processor, non-volatile storage, memory, human-machine interface (HMI) components, communication interfaces (for communication via the network 420), and the like.

The non-volatile storage device 402 may comprise a single non-volatile storage device, may comprise a plurality of non-volatile storage devices, a cluster of storage devices, or other suitable configuration. The virtual storage layer 430 may comprise a driver, a user-space application, or the like. In some embodiments, the virtual storage layer 430 is implemented in conjunction with the driver 118 described above. The virtual storage layer 430 and/or the storage clients 412 may be embodied as instructions stored on a non-volatile storage device.

The VSL 430 may maintain and present a logical address space to 432 to the storage clients 412 via one or more interfaces and/or APIs provided by the VSL 430 (VSL interface 440). The storage clients 412 may include, but are not limited to: operating systems, virtual operating systems (e.g., guest operating systems, hypervisors, etc.), file systems, database applications, server applications, general-purpose applications, and the like. In some embodiments, one or more storage clients 412 operating on a remote computing device 442 as storage clients 444 access the VSL 430 via a network 420.

The VSL 430 is configured to perform persistent storage operations on the non-volatile storage device 402, which may comprise a non-volatile storage device as described above. The VSL 430 communicates with the non-volatile storage device 402 via a communication bus 422, which may include, but is not limited to: a PCE-e bus, a network connection (e.g., Infiniband), a storage network, Fibre Channel Protocol (FCP) network, HyperSCSI, or the like. The storage operations may be configured according to the capabilities and/or configuration of the non-volatile storage device 402. For example, if the non-volatile storage device 402 comprises a write-once, block-erasable device, the VSL 430 may be configured to perform storage operations accordingly (e.g., storage data on initialized or erased storage locations, etc.).

In some embodiments, the VSL 430 accesses storage metadata 434 to maintain associations between logical identifiers (e.g., blocks) in the logical address space 432 and physical storage locations on the non-volatile storage device 402. As used herein, a physical storage location may refer to any storage location of the non-volatile storage device 402, which may include, but are not limited to: storage divisions, erase blocks, storage units, pages, logical pages, logical erase blocks, and so on.

The VSL 430 maintains "any-to-any" assignments between logical identifiers in the logical address space 432 and physical storage locations on the non-volatile storage device 402. The VSL 430 may cause data to be written or updated "out-of-place" on the non-volatile storage device 402. In some embodiments, data is stored sequentially and in a log-based format. Storing data "out-of-place" provides wear-leveling benefits and addresses "erase-and-program-once" properties of many non-volatile storage devices. Moreover, out-of-place writing (and writing data in logical storage locations as opposed to individual pages) addresses asymmetric properties of the non-volatile storage device 402. Asymmetric properties refers to the idea that different storage operations (read, write, erase) take very different amounts of time. For example, it may take ten times as long to program data on a non-volatile storage media 410 as it takes to read data from the non-volatile storage media 410. Moreover, in some cases, data may only be programmed to physical storage locations that have first been initialized (e.g., erased). An erase operation may take ten times as long as a program operation (and by extension one hundred times as long as a read operation). Associations between logical identifiers in the logical address space 432 and physical storage locations on the non-volatile storage device 402 are maintained in the storage metadata 434.

In some embodiments, the VSL 430 causes data to be persisted on the non-volatile storage 402 in a sequential, log-based format. Sequential, log-based storage may comprise persisting the order of storage operations performed on the non-volatile storage device 402. In some embodiments, data is stored with persistent metadata that is persisted on the non-volatile storage device 402 with the data itself. For example, a sequence order of storage operations performed may be maintained using sequence indicators (e.g., timestamps, sequence numbers, or other indicators) that are stored on the non-volatile storage device 402 and/or the current storage location (e.g., append point, discussed below) of the non-volatile storage device 402.

Persisting data in a sequential, log-based format may comprise persisting metadata on the non-volatile storage device 402 that describes the data. The persistent metadata may be stored with the data itself (e.g., in the same program and/or storage operation and/or in the smallest write unit supported by the non-volatile storage device 402); the persistent metadata may, therefore, be guaranteed to be stored with the data it describes. In some embodiments, data is stored in a container format (e.g., a packet, ECC codeword, etc.). Persistent metadata may be included as part of the packet format of the data (e.g., as a header, footer, or other field within the packet).

Alternatively, or in addition, portions of the persistent metadata may be stored separately from the data it describes.

The persistent metadata describes the data and may include, but is not limited to: a logical identifier (or other identifier) of the data, security or access control parameters, sequence information (e.g., a sequence indicator), a persistent metadata flag (e.g., indicating inclusion in an atomic storage operation), a transaction identifier, or the like. The persistent metadata may comprise sufficient information to reconstruct the storage metadata and/or replay the sequence of storage operations performed on the non-volatile storage device 402.

The sequential, log-based data may comprise an "event log" of storage operations that are performed on the non-volatile storage device 402. Accordingly, the VSL 430 may be capable of replaying a sequence of storage operations performed on the non-volatile storage device 402 by accessing the data stored on the non-volatile storage media 410 in a particular order that matches the order of the event log. The sequential, log-based data format enables the VSL 430 to reconstruct the storage metadata 434, as well as other data, in the event of an invalid shutdown (or other failure condition). Examples of apparatus, systems, and methods for crash recovery and/or data integrity despite invalid shutdown conditions are described in U.S. Provisional Patent Application No. 61/424,585, entitled, "APPARATUS, SYSTEM, AND METHOD FOR PERSISTENT MANAGEMENT OF DATA IN A CACHE DEVICE," filed Dec. 17, 2010, and in U.S. Provisional Patent Application No. 61/425,167, entitled, "APPARATUS, SYSTEM, AND METHOD FOR PERSISTENT MANAGEMENT OF DATA IN A CACHE DEVICE," filed Dec. 20, 2010, which are hereby incorporated by reference in their entirety. In some embodiments, the non-volatile storage device 402 comprises a secondary power source 407 (e.g., battery, capacitor, etc.) to power the storage controller 404 and/or non-volatile storage media 410 in the event of an invalid shutdown. The non-volatile storage device 402 (or controller 404) may, therefore, comprise a "protection domain" or "powercut safe domain" (defined by the secondary power source 407). Once data is transferred to within the protection domain, of the non-volatile storage device, it may be guaranteed to be persisted on the non-volatile storage media 410. Alternatively, or in addition, the storage controller 404 may be capable of performing storage operations independent of the host computing device 401.

The sequential, log-based storage format implemented by the VSL 430 provides crash-recovery and/or data integrity for the data stored on the non-volatile storage 402 as well as the storage metadata 434. After an invalid shutdown and reconstruction operation, the VSL 430 may expose the reconstructed storage metadata 434 to storage clients 412. The storage clients 412 may, therefore, delegate crash-recovery and/or data integrity to the VSL 430, which may significantly simplify the storage clients 412 and/or allow the storage clients 412 to operate more efficiently. For example, a file system storage client 412 may require crash-recovery and/or data integrity services for some of its metadata, such as I-node tables, file allocation tables, and so on. The storage client 412 may have to implement these services itself, which may impose significant overhead and/or complexity on the storage client 412. The storage client 412 may be relieved from this overhead by delegating crash recovery and/or data integrity to the VSL 430. As described above, the VSL 430 stores data in a sequential, log-based format. As such, in the event of an invalid shutdown, the VSL 430 is capable of reconstructing the storage metadata 434 and/or identifying the "current" version of data using the sequential, log-based formatted data on the non-volatile storage device 402. The VSL 430 provides access to the reconstructed storage metadata 434 and/or data via the VSL interface 440. Accordingly, after an invalid shutdown, a file system storage client 412 may access crash-recovered file system metadata and/or may ensure the integrity of file data accessed through the VSL 430.

The logical address space 432 may be "sparse" meaning the logical address space 432 is large enough that allocated/assigned logical identifiers are non-contiguous and separated by sections of one or more unallocated/unassigned addresses, and, as such, may comprise a logical capacity that exceeds the physical storage capacity of the non-volatile storage device 402. Accordingly, the logical address space 432 may be defined independent of the non-volatile storage device 402; the logical address space 432 may present a larger address space than the physical storage capacity of the non-volatile storage device 402, may present different storage location partitions and/or block sizes than provided by the non-volatile storage device 402, and so on. Associations between the logical address space 432 and the non-volatile storage 402 are managed by the VSL 430 (using the storage metadata 434). Storage clients 412 may leverage the VSL interface 440, as opposed to a more limited block-storage layer and/or the other storage interface provided by a particular non-volatile storage device 402.

In some embodiments, the logical address space 432 may be very large, comprising a 64-bit address space referenced by 64-bit logical identifiers (LIDs). Each 64-bit logical identifier in the logical address space 432 (e.g., 64-bit address) references a respective virtual storage location. As used herein, a virtual storage location refers to a block of logical storage capacity (e.g., an allocation block). The VSL 430 may be configured to implement arbitrarily sized virtual storage locations; typical sizes range from 512 to 4086 bytes (or even 8 kb to 16 kb depending on the needs of the storage clients 412); the disclosure, however, is not limited in this regard. Since the logical address space 432 (and the virtual storage locations therein) is independent of the physical storage capacity and/or storage partitioning of the non-volatile storage device 402, the logical address space 432 may be tailored to the requirements of the storage clients 412.

The VSL 430 may manage allocations within the logical address space using storage metadata 434. In some embodiments, the VSL 430 maintains storage metadata 434 that tracks allocations of the logical address space 432 using a forward index. The VSL 430 may allocate ranges within the logical address space 432 for use by particular storage clients 412. Logical identifiers may be allocated for a particular storage client 412 to persist a storage entity. As used herein, a storage entity refers to any data or data structure in the logical address space 412 that is capable of being persisted to the non-volatile storage device 402; accordingly, a storage entity may include, but is not limited to: file system objects (e.g., files, streams, I-nodes, etc.), a database primitive (e.g., database table, extent, or the like), streams, persistent memory space, memory mapped files, or the like. A storage entity may also be referred to as a Virtual Storage Unit (VSU). A file system object refers to any data structure used by a file system including, but not limited to: a file, a stream, file attributes, file index, volume index, node table, or the like.

As described above, allocating a logical identifier refers to reserving a logical identifier for a particular use or storage client. A logical identifier may refer to a set or range of the logical address space 432 (e.g., a set or range of virtual storage locations). The logical capacity of an allocated logical identifier may be determined by the size of the virtual storage locations of the logical address space 432. As described above, the logical address space 432 may be configured to present virtual storage locations of any pre-determined size. The size of the virtual storage locations may be configured by one or more storage clients 412, the VSL 430, or the like.

An allocated logical identifier, however, may not necessarily be associated with and/or assigned to physical storage locations on the non-volatile storage device 402 until required. In some embodiments, the VSL 430 allocates logical identifiers comprising large, contiguous ranges in the logical address space 432. The availability of large, contiguous ranges in the logical address space is enabled by the large address space (e.g., 64-bit address space) presented by the VSL 430. For example, a logical identifier allocated for a file may be associated by the VSL 430 with an address range of 2^32 contiguous virtual storage locations in the logical address space 432 for data of the file. If the virtual storage locations (e.g., allocation blocks) are 512 bytes each, the allocated logical identifier may represent a logical capacity of two (2) terabytes. The physical storage capacity of the non-volatile storage device 402 may be smaller than two (2) terabytes and/or may be sufficient to store only a small number of such files, such that if logical identifier allocations were to cause equivalent assignments in physical storage space, the VSL 430 would quickly exhaust the capacity of the non-volatile storage device 402. Advantageously, however, the VSL 430 is configured to allocate large, contiguous ranges within the logical address space 432 and to defer assigning physical storage locations on the non-volatile storage device 402 to the logical identifiers until necessary. Similarly, the VSL 430 may support the use of "sparse" allocated logical ranges. For example, a storage client 412 may request that a first data segment be persisted at the "head" of an allocated logical identifier and a second data segment be persisted at the "tail" of an allocated logical identifier. The VSL 430 may assign only those physical storage locations on the non-volatile storage device 402 that are needed to persist the first and second data segments. The VSL 430 may not assign or reserve physical storage locations on the non-volatile storage device 402 for allocated logical identifiers that are not being used to persist data.

The VSL 430 maintains storage metadata 434 to track allocations in the logical address space and to track assignments between logical identifiers in the logical address space 432 and physical storage locations on the non-volatile storage media 410. In some embodiments, the VSL 430 track both logical allocations and physical storage location assignments using a single metadata structure. Alternatively, or in addition, the VSL 430 may be configured to track logical allocations in logical allocation metadata and to track assigned physical storage locations on the non-volatile storage media 410 using separate, physical reservation metadata.

Storage clients 412 may access the VLS 430 via the VSL interface 440. In some embodiments, storage clients 412 may delegate certain functions to the VSL. For example, and as described above, storage clients 412 may leverage the sequential, log-based data format of the VSL 430 to delegate crash recovery and/or data integrity functions to the VSL 430. In some embodiments, storage clients may also delegate allocations in the logical address space 432 and/or physical storage reservations to the VSL 430.

Typically, a storage client 412, such as a file system, tracks the logical addresses and/or physical storage locations that are available for use. The logical storage locations available to the storage client 412 may be limited to the physical storage capacity of the underlying non-volatile storage device (or partition thereof). Accordingly, the storage client 412 may maintain a set of logical addresses that "minors" the physical storage locations of the non-volatile storage device. For example, and as shown in FIG. 4, a storage client 412 may identify one or more available logical block addresses (LBAs) for a new file. Since the LBAs map directly to physical storage locations in conventional implementations, the LBAs are unlikely to be contiguous; the availability of contiguous LBAs may depend upon the capacity of the underlying block storage device and/or whether the device is "fragmented." The storage client 412 then performs block-level operations to store the file through, inter alia, a block storage layer (e.g., a block-device interface). If the underlying storage device provides a one-to-one mapping between logical block address and physical storage locations, as with conventional storage devices, the block storage layer performs appropriate LBA-to-physical address translations and implements the requested storage operations. If, however, the underlying non-volatile storage device does not support one-to-one mappings (e.g., the underlying storage device is a sequential, or write-out-of-place device, such as a non-volatile storage device, in accordance with embodiments of this disclosure), another redundant set of translations is needed (e.g., a Flash Translation Layer, or other mapping). The redundant set of translations and the requirement that the storage client 412 maintain logical address allocations may represent a significant overhead for storage operations performed by the storage client 412 and may make allocating contiguous LBA ranges difficult or impossible without time-consuming "defragmentation" operations.

In some embodiments, storage clients 412 delegate allocation functionality to the VSL 430. Storage clients 412 may access the VSL interface 440 to request logical ranges in the logical address space 432. The VSL 430 tracks the allocation status of the logical address space 432 using the storage metadata 434. If the VSL 430 determines that the requested logical address range is unallocated, the VSL 430 allocates the requested logical address range for the storage client 412. If the requested range is allocated (or only a portion of the range is unallocated), the VSL 430 may return an alternative range in the logical address space 430 and/or may return a failure. In some embodiments, the VSL 430 may return an alternative range in the logical address space 430 that includes contiguous range of logical addresses. Having a contiguous range of logical addresses often simplifies the management of the storage entity associated with this range of logical addresses. Since the VSL 430 uses the storage metadata 434 to maintain associations between the logical address space 432 and physical storage locations on the non-volatile storage device 402, no redundant set of address translations is needed. Moreover, the VSL 430 uses the storage metadata 434 to identify unallocated logical identifiers, which frees the storage client 412 from this overhead.

In some embodiments, the VSL 430 makes allocations within the logical address space 432 as described above. The VSL 430 may access an index comprising allocated logical address ranges (e.g., forward index of FIG. 5) to identify unallocated logical identifiers, which are allocated to storage clients 412 upon request. For example, the VSL 430 may maintain storage metadata 434 comprising a range-encoded tree data structure, as described above; entries in the tree may represent allocated logical identifiers in the logical address space 432, and "holes" in the tree represent unallocated logical identifiers. Alternatively, or in addition, the VSL 430 maintains an index of unallocated logical identifiers that can be allocated to storage clients (e.g., without searching a forward index).

Figure 5:
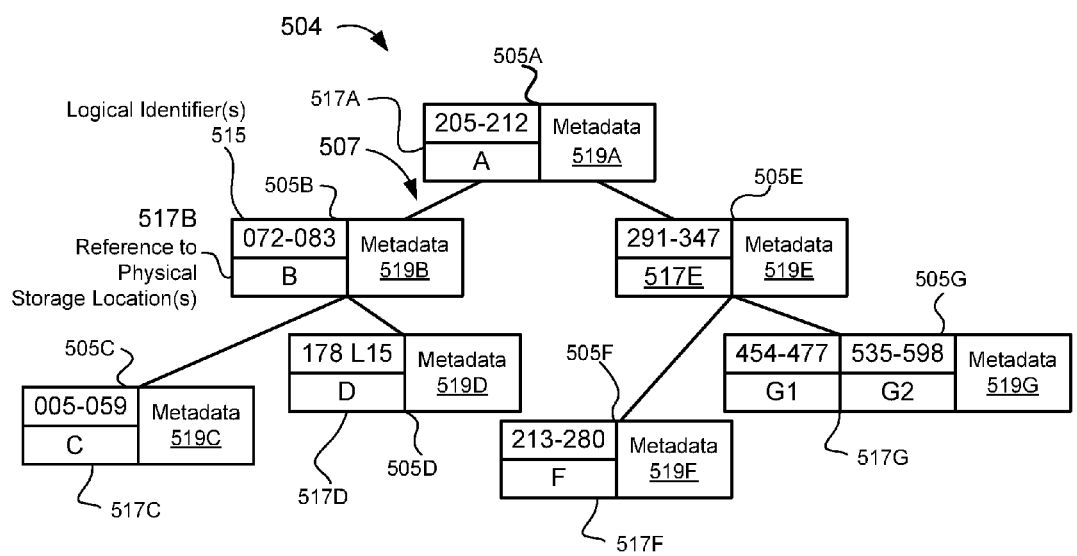
FIG. 5 depicts one embodiment of a forward index.

FIG. 5 depicts one example of storage metadata and, in particular, a forward index 504 that maintains allocations of the logical address space of one or more non-volatile storage devices (e.g., storage devices 106 described above). The forward index 504 may be further configured to maintain assignments between allocated logical identifiers and physical storage locations on a non-volatile storage device. The forward index 504 may be maintained by the VSL 430, a storage controller (e.g., storage controller 404, described above), and/or a driver (e.g., driver 118 described above), or the like.

In the FIG. 5 example, the data structure 504 is implemented as a range-encoded B-tree. The disclosure is not limited in this regard, however; the forward index 504 may be implemented using and suitable data structure including, but not limited to: a tree, a B-tree, a range-encoded B-tree, a radix tree, a map, a content addressable map (CAM), a table, a hash table, or other suitable data structure (or combination of data structures).

The forward index 504 comprises a plurality of entries 505 (entries 505A-G), each representing one or more logical identifiers in the logical address space. For example, the entry 505B references logical identifiers 515 (LIDs 072-083). Data may be stored sequentially or "out-of-place" on the non-volatile storage device and, as such, there may be no correspondence between logical identifiers and the physical storage locations. The forward index 504 maintains assignments between allocated logical identifiers and physical storage locations (e.g., using physical storage location references 517). For example, the reference 517B assigns the logical identifiers 515 (LIDs 072-083) to one or more physical storage locations of the non-volatile storage device. In some embodiments, the references 517 comprise a physical address on the non-volatile storage device. Alternatively, or in addition, the references 517 may correspond to a secondary datastructure (e.g., a reverse index), or the like. The references 517 may be updated in response to changes to the physical storage location of data (e.g., due to grooming operations, data refresh, modification, overwrite, or the like).

In some embodiments, one or more of the entries 505 may represent logical identifiers that have been allocated to a storage client, but have not been assigned to any particular physical storage locations (e.g., the storage client has not caused data to be written to the logical identifiers). The physical storage location reference 517 of an unassigned entry 505 may be marked as "null" or not assigned.

The entries 505 are arranged into a tree data structure by the edges 507. In some embodiments, the entries 505 are indexed by logical identifier, which provides for fast and efficient entry 505 lookup. In the FIG. 5 example, the entries 505 are arranged in logical identifier order such that the entry 505C references the "lowest" logical identifiers and 505G references the "largest" logical identifiers. Particular entries 505 are accessed by traversing the edges 507 of the forward index 504. In some embodiments, the forward index 504 is balanced, such that all leaf entries 505 are of a similar depth within the tree.

For clarity, the FIG. 5 example depicts entries 505 comprising numeric logical identifiers, however, the disclosure is not limited in this regard, and one of skill in the art will recognize that the entries 505 could comprise any suitable logical identifier representation, including, but not limited to: alpha-numerical characters, hexadecimal characters, binary values, text identifiers, hash codes, or the like.

The entries 505 of the index 504 may reference logical identifiers of variable size and/or length; a single entry 51205 may reference a plurality of logical identifiers (e.g., a set of logical identifiers, a logical identifier range, a noncontiguous set of logical identifiers, or the like). For example, the entry 505B represents a contiguous range of logical identifiers 072-083. Other entries of the index 504, may represent a noncontiguous set of logical identifiers; entry 505G represents logical identifiers 454-477 and 535-598, each assigned to respective physical storage locations by respective references 517G and 527G. The forward index 504 may represent logical identifiers using any suitable technique; for example, the entry 505D references logical identifier 178 and length 15, which corresponds to a range of logical identifiers 178-192.

In some embodiments, the entries 504 comprise and/or reference metadata 519, which may comprise metadata pertaining to the logical identifiers, such as age, size, logical identifier attributes (e.g., client identifier, data identifier, file name, group identifier), the underlying physical storage location(s), or the like. The metadata 519 may be indexed by logical identifier (through association with the respective entries 505) and, as such, the metadata 519 may remain associated with entry 505 regardless of changes to the location of the underlying physical storage locations of the data.

The index 504 may be used to efficiently determine whether the non-volatile storage device comprises a particular logical identifier. In one example, a storage client may request allocation of a particular logical identifier. If the index 504 comprises and entry 505 that includes the requested logical identifiers, the logical identifier(s) associated with the request may be identified as being already allocated. If the logical identifiers are not in the index, they may be allocated to the requester by creating a new entry 505 in the index 504. In another example, a storage client requests data of a particular logical identifier. The physical storage location of the data is determined by accessing the reference 517 to the physical storage location of the entry 505 comprising the logical identifier. In another example, a client modifies data pertaining to a logical identifier. In another example, a storage client modifies existing data of a particular logical identifier. The modified data is written sequentially to a new physical storage location on the non-volatile storage device, and the physical storage location reference 517 of the entry 505 in the index 504 is updated to reference the physical storage location of the new data. The obsolete data may be marked as invalid for reclamation in a grooming operation.

The forward index 504 of FIG. 5 maintains a logical address space and, as such, is indexed by logical identifier. As discussed above, entries 505 in index 504 may comprise references 517 to physical storage locations on a non-volatile storage device. In some embodiments, the references 517 may comprise physical addresses (or address ranges) of the physical storage locations. Alternatively, or in addition, the references 517 may be indirect (e.g., reference a secondary datastructure, such as a reverse index).

Figure 6:
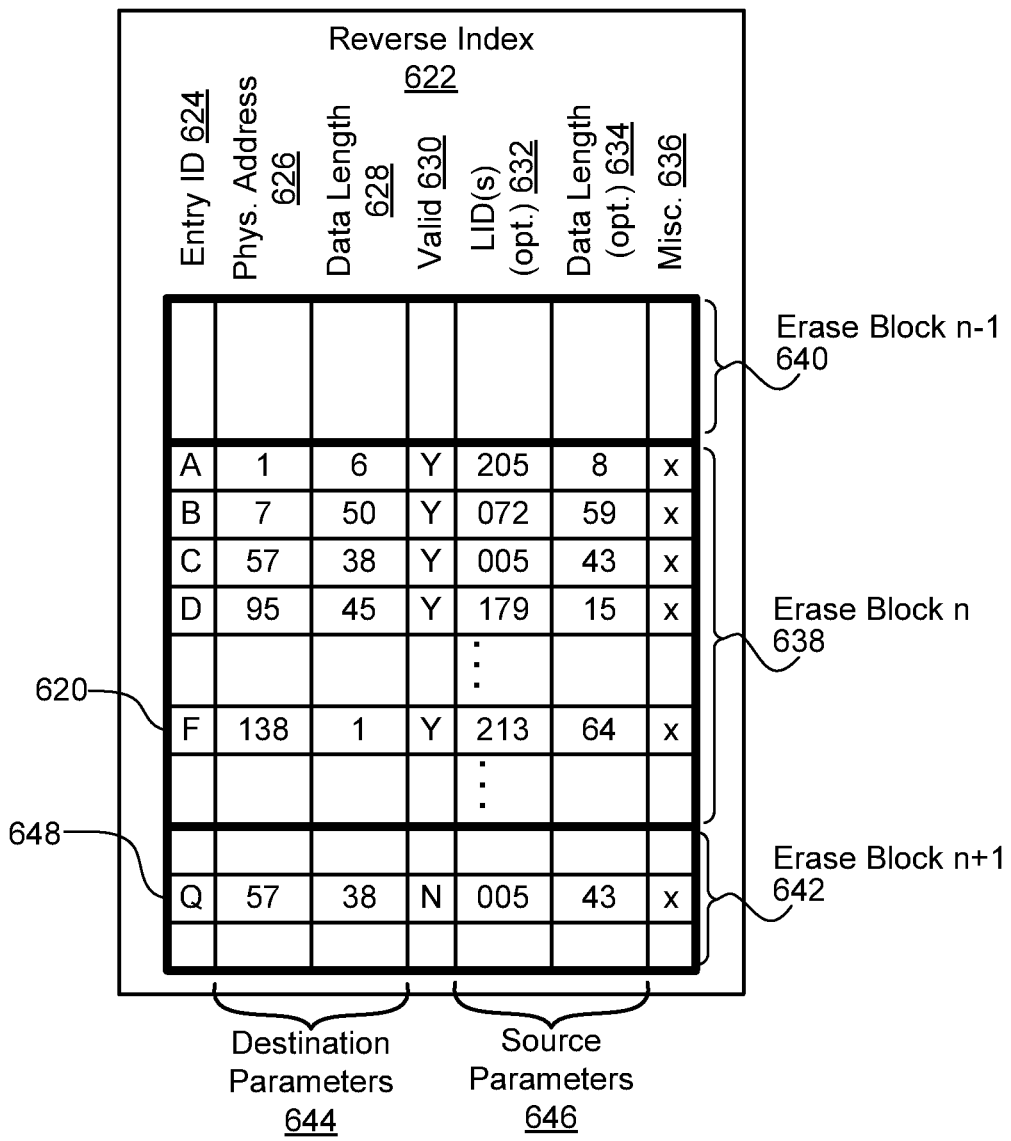
FIG. 6 depicts one embodiment of a reverse index.

FIG. 6 depicts one example of a reverse index 622 for maintaining metadata pertaining to physical storage locations of a non-volatile storage device. In the FIG. 6 example, the reverse index 622 is implemented as a table data structure. The disclosure is not limited in this regard, however, and could implement the reverse index 622 using any suitable datastructure. For example, in some embodiments, the reverse index 622 is implemented in the same data structure with the forward index 504 described above (e.g., portions and/or entries of the reverse index 622 may be included as leaf entries of the forward index 504). The index 622 comprises a plurality of entries 620 (depicted as rows in the table datastructure 622), each of which may comprise an entry ID 624, a physical address 626, a data length 628 associated with the data stored at the physical address 626 on the non-volatile storage media 410 (in this case the data is compressed), a valid tag 630, a logical address 632 associated with the data, a data length 634 associated with the logical address 632, and other miscellaneous data 636. In a further embodiment, the reverse index 622 may include an indicator of whether the physical address 626 stores dirty or clean data, or the like.

The reverse index 622 may be organized according to the configuration and/or layout of a particular non-volatile storage device. Accordingly, the reverse index 622 may be arranged by storage divisions (e.g., erase blocks), physical storage locations (e.g., pages), logical storage locations, or the like. In the FIG. 6 example, the reverse index 622 is arranged into a plurality of erase blocks (640, 638, and 642), each comprising a plurality of physical storage locations (e.g., pages, logical pages, or the like).

The entry 620 comprises metadata pertaining to the physical storage location(s) comprising data of the entry 505F of FIG. 5. The entry 620 indicates that the physical storage location is within erase block n 638. Erase block n 638 is preceded by erase block n−1 640 and followed by erase block n+1 642. (The contents of erase blocks n−1 and n+1 are not shown).

The entry ID 624 may be an address, a virtual link, or other data to associate entries in the reverse index 622 with entries in the forward index 504 (or other storage metadata). The physical address 626 indicates a physical address on the non-volatile storage device (e.g., non-volatile storage media 410). The data length 628 associated with the physical address 626 identifies a length of the data stored at the physical address 626. Together the physical address 626 and data length 628 may be referred to as destination parameters 644.

The logical identifier 632 and data length 634 may be referred to as source parameters 646. The logical identifier 632 associates the entry with a logical identifier of the logical address space. The logical identifier 632 may be used to associate an entry in the reverse index 622 with an entry 505 of the forward index 504. The data length 624 refers to the length of the data in the logical address space (e.g., from the perspective of the storage client). The source parameter 646 data length 634 may be different from the source parameter 644 data length 634 due to, inter alia, data compression, header overhead, encryption overhead, or the like. In the FIG. 6 example, the data associated with the entry 620 is highly compressible and was compressed from 64 blocks in the logical address space to 1 block on the non-volatile storage device.

The valid tag 630 indicates whether the data mapped to the entry 620 is valid. In this case, the data associated with the entry 620 is valid and is depicted in FIG. 6 as a "Y" in the row of the entry 620. As used herein, valid data refers to data that is up-to-date and has not been deleted and/or made obsolete (overwritten or modified). The reverse index 622 may track the validity status of each physical storage location of the non-volatile storage device. The forward index 504 may comprise entries corresponding to valid data only. In the FIG. 6 example, entry "Q" 648 indicates that data associated with the entry 648 is invalid. Note that the forward index 504 does not include logical addresses associated with entry Q 648. The entry Q 648 may correspond to an obsolete version of the data of entry 505C (overwritten by data now stored at entry "C").

The reverse index 622 may maintain entries for invalid data so that valid and invalid data can be quickly distinguished for storage recovery (e.g., grooming). In some embodiments, the forward index 504 and/or the reverse index 622 may track dirty and clean data in a similar manner to distinguish dirty data from clean data when operating as a cache.

In some embodiments, the reverse index 622 may omit the source parameters 646. For example, if the source parameters 646 are stored with the data, possibly in a header of the stored data, the reverse index 622 may identify a logical address indirectly by including a physical address 626 associated with the data and the source parameters 646 could be identified from the stored data.

The reverse index 622 may also include other miscellaneous data 636, such as a file name, object name, source data, storage client, security flags, atomicity flag, transaction identifier, or the like. One of skill in the art will recognize other information useful in a reverse index 622. While physical addresses 626 are depicted in the reverse index 622, in other embodiments, physical addresses 626, or other destination parameters 644, may be included in other locations, such as in the forward index 604, an intermediate table or data structure, or the like.

The reverse index 622 may be arranged by erase block or erase region (or other storage division) so that traversing a section of the index allows a groomer to identify valid data in a particular storage division (e.g., erase block 638) and to quantify an amount of valid data, or conversely invalid data, therein. The groomer may select storage divisions for recovery based, in part, on the amount of valid and/or invalid data in each division.

In some embodiments the groomer and/or garbage collection processes are restricted to operating within certain portions of the physical storage space. For example, portions of the storage metadata 434 may be periodically persisted on the non-volatile storage device 402, and the garbage collector and/or groomer may be limited to operating on the physical storage locations corresponding to the persisted storage metadata 434. In some embodiments, storage metadata 434 is persisted by relative age (e.g., sequence), with older portions being persisted, while more current portions are retained in volatile memory. Accordingly, the groomer and/or garbage collection systems may be restricted to operating in older portions of the physical address space and, as such, are less likely to affect data of an in process atomic storage request. Therefore, in some embodiments, the garbage collection system and/or groomer may continue to operate while an atomic storage request is serviced. Alternatively, or in addition, the garbage collection system and/or groomer may access the storage metadata and/or inflight index (discussed below) to prevent interference with atomic storage operations.

Referring back to FIG. 4, the non-volatile storage device 402 may be configured to store data on the non-volatile storage media 410 in a sequential, log-based format. The contents of the non-volatile storage device may, therefore, comprise an ordered "event log" of storage operations on the non-volatile storage media 410. The sequential ordering of storage operations may be maintained by appending data at an append point within the physical storage space of the non-volatile storage device 402. Alternatively, or in addition, sequence information may be maintained through persistent data stored on the non-volatile storage device 402. For example, each storage division on the storage device may comprise a respective indicator (e.g., timestamp, sequence number, or other indicator), to indicate an order of the storage division within the event log.

Figure 7A:
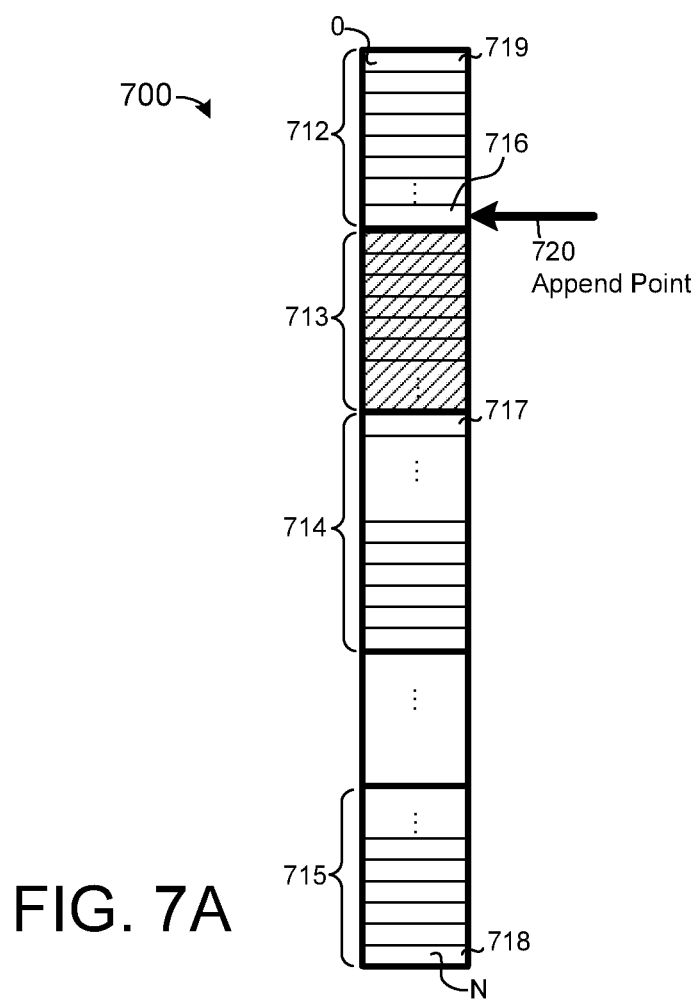
FIG. 7A depicts one embodiment of an append point within a physical storage space of a non-volatile storage device.

FIG. 7A depicts a physical storage space 700 of a non-volatile storage device. The physical storage space 700 is arranged into storage divisions (e.g., erase blocks 712), each of which can be initialized (e.g., erased) in a single operation. Each storage division comprises a plurality of physical storage locations (e.g., pages or logical pages) capable of storing data.

Each physical storage location may be assigned a respective physical address ranging from zero (0) to N. Data is stored sequentially at an append point 720. The append point 720 moves sequentially through the physical storage space 700. After storing data at the append point 720, the append point advances sequentially to the next available physical storage location. As used herein, an available physical storage location refers to a physical storage location that has been initialized and is ready to store data (e.g., has been erased). Some non-volatile storage media, such as non-volatile storage media 410, can only be programmed once after erasure. Accordingly, as used herein, an available physical storage location may refer to a storage location that is in an initialized (or erased) state. If the next storage division in the sequence is unavailable (e.g., comprises valid data, has not been erased or initialized, is out of service, etc.), the append point 720 selects the next available physical storage location. In the FIG. 7 example, after storing data on the physical storage location 716, the append point 720 may skip the unavailable storage division 713, and continue at the next available location (e.g., physical storage location 717 of storage division 718).

Figure 7B:
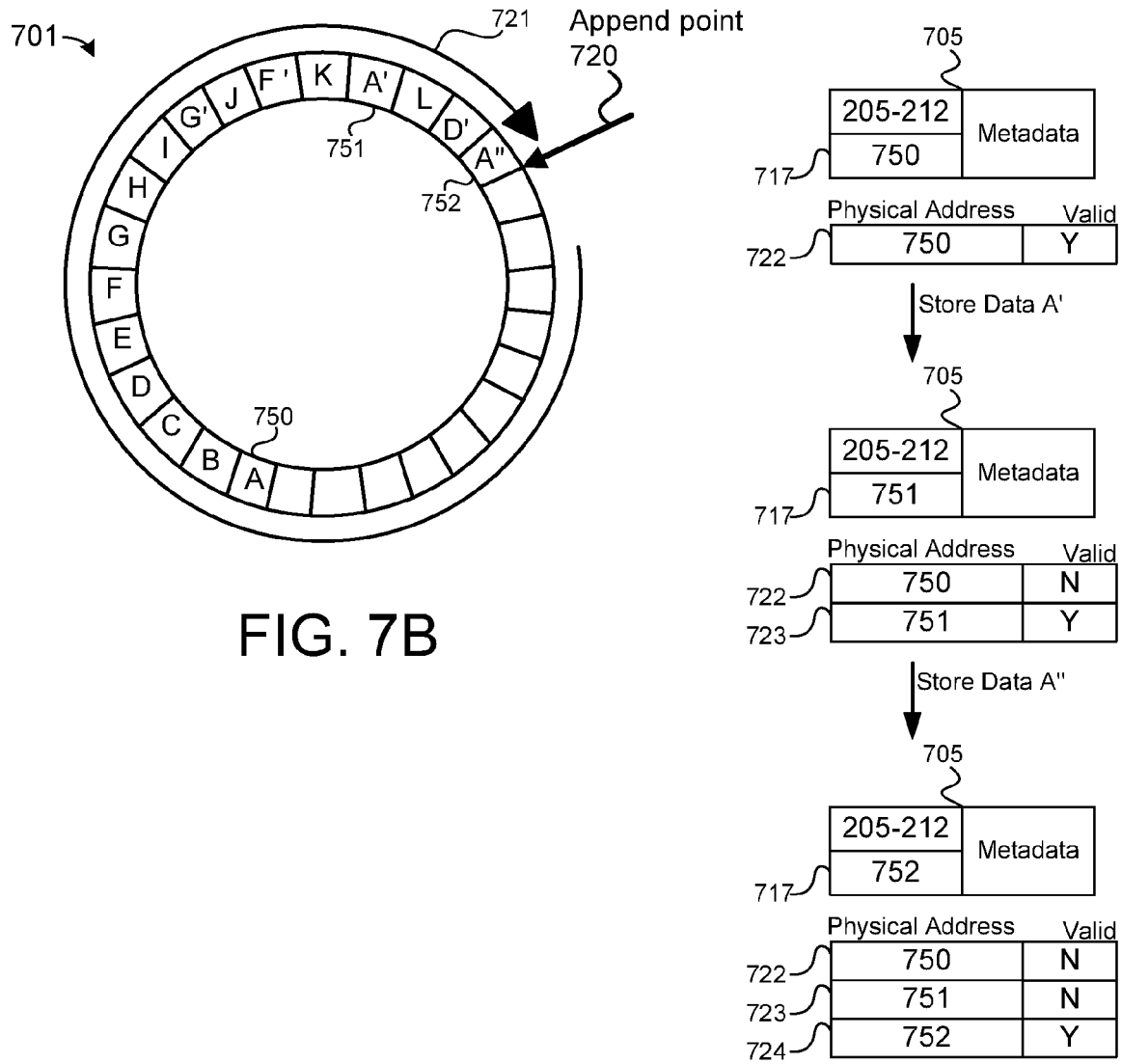
FIG. 7B depicts cyclic, sequential storage operations on a non-volatile storage device according to one embodiment.

After storing data on the "last" storage location (e.g., storage location N 718 of storage division 815), the append point 720 wraps back to the first division 712 (or the next available storage division if 712 is unavailable). Accordingly, the append point 720 may treat the physical address space 710 as a loop or cycle. As depicted in FIG. 7B, the append point 720 sequentially cycles through the storage locations 701 of the non-volatile storage device.

As discussed above, storing data in a sequential, log-based format may comprise persisting metadata on the non-volatile storage device 402 that describes the data stored thereon. The persistent metadata may comprise the logical identifier associated with the data and/or provide sequence information pertaining to the sequential ordering of storage operations performed on the non-volatile storage device. Accordingly, the sequential, log-based data may represent an "event log" that tracks the sequence of storage operations performed on the non-volatile storage device 402.

Figure 8:
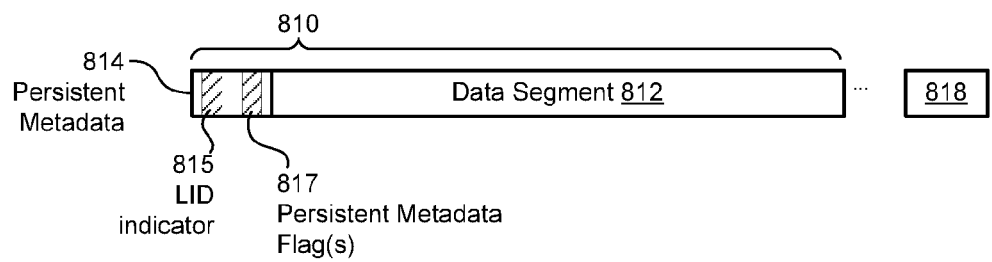
FIG. 8 depicts one embodiment of a log-based data format.

FIG. 8 depicts one example of a sequential, log-based data format (packet format 810). A data packet 810 includes a data segment 812 comprising data of one or more logical identifiers. In some embodiments, the data segment 812 comprises compressed, encrypted, and/or whitened data. Furthermore, the data segment 812 may be encoded in one or more error-correcting code datastructures (e.g., ECC codewords). The data segment 812 may be a predetermined size (e.g., a fixed "block" or "segment" size). Alternatively, the data segment 812 may be a variable size.

The packet 810 includes persistent metadata 814 that is stored on the non-volatile storage device. In some embodiments, the persistent metadata 814 is stored with the data segment 812 (e.g., as a packet header, footer, or the like). The persistent metadata 814 may include a logical identifier indicator 815 that identifies the logical identifier(s) to which the data segment 812 pertains. The logical identifier indicator 815 may be used to reconstruct the storage metadata, such as the forward index (e.g., forward index 504) and/or reverse index (e.g., reverse index 622). The persistent metadata 814 may further comprise one or more metadata flags 817. As discussed below, the flags 817 may be used to support atomic storage operations, transactions, or the like.

In some embodiments, the packet 810 is associated with a sequence indicator 818. The sequence indicator 818 may be persisted on the storage location (e.g., page) with the packet 810 and/or on the storage division (e.g., erase block) of the packet 810. Alternatively, the sequence indicator 818 may be persisted in a separate storage location. In some embodiments, a sequence indicator is applied when a storage division is made available for use (e.g., when erased, when the first or last storage location is programmed, or the like). The sequence indicator 818 may be used to determine the temporal sequential ordering of storage operations on the non-volatile storage device.

Referring back to FIG. 4, the sequential, log-based format disclosed herein enables the VSL 430 to reconstruct the storage metadata 434, as well as other data, in the event of an invalid shutdown (or other failure condition).

The storage metadata 434 (e.g., the forward index 504 of FIG. 5) maintains assignments between logical identifiers and physical storage locations on the non-volatile storage device. Accordingly, there may be no pre-determined mapping between logical identifiers and physical storage locations; data of a logical identifier may be stored on any arbitrary physical storage location of the non-volatile storage device. Moreover, since data is stored in sequentially and in a log-based format, when data is overwritten or modified, previous versions of the data may be retained (until recovered in a grooming operation).

Referring back to FIG. 7B, the letters A-L represent data stored on physical storage locations of a non-volatile storage device. Data A is initially stored at physical storage location 750. When the data A is persisted at location 750, the physical storage location reference 717 of the corresponding forward index entry 705 is updated to reference the physical storage location 80. In addition, a reverse index entry 722 may be updated to indicate that the physical storage location 80 comprises valid data and/or to associate the physical storage location 750 with logical identifiers 205-212 (not shown). (For clarity, other portions of the forward index and/or reverse index are omitted from FIG. 7B.)

When the data A is modified and/or overwritten, the updated data may not be stored in the original physical storage location 750. Instead, the updated data A' is stored sequentially (out-of-place) at storage location 751 (at the current position of the append point 720). The storage metadata is updated accordingly. The forward index entry 705 is updated to associate the logical identifiers 205-212 with the physical storage location 81 comprising A'. The entry 722 of the reverse index is updated to mark physical storage location 80 as invalid and to indicate that the physical storage location 81 comprises valid data. Marking the physical storage location 80 as invalid may allow the storage location 80 to be reclaimed in a grooming and/or garbage collection operation, as described above.

The data A' is further modified and/or overwritten with data A". The updated data A" is stored at the current append point 720 (physical storage location 752). The storage metadata is updated, as described above: the forward index entry 705 is updated to associate the entry with the physical storage location 752, and a reverse index entry 724 is updated to indicate that the physical storage address 82 comprises valid data (and that the physical address 81 comprises invalid data).

The "obsolete" versions A and A' may be retained on the non-volatile storage device until the corresponding physical storage locations 80 and/or 81 are reclaimed (e.g., erased) in a grooming operation.

The data A, A', and A" may be stored in the sequential, log-based format (an "event-log" format) described above. Storage metadata, such as the forward index 504 of FIG. 5 may be reconstructed from the sequential, log-based formatted data. The logical identifier indicator of the persistent metadata stored with data A, A', and/or A" may indicate that the data stored at the physical storage locations 80, 81, and 82 corresponds to logical identifiers 205-212. A sequence indicator of the data A, A', and/or A" (and/or the position of the append point 50) indicates that the physical storage location 82 comprises the current, valid copy of the data. Therefore, the forward index entry 705 may be reconstructed to associate the logical identifiers 205-212 with the physical storage location 82. In addition, the reverse index entries 722, 723, and/or 724 may be reconstructed to indicate that the physical storage locations 750 and 751 comprise invalid data, and that the physical storage location 752 comprises valid data.

The storage metadata and sequential, log-based data storage disclosed herein may be leveraged to implement efficient atomic operations. Many applications (e.g., user applications 412) rely on atomic storage operations. Atomic storage operations may be limited to a relatively small, fixed-sized data (e.g., a single sector within a block storage device). Atomic storage operations may require a "copy on write" operation to ensure consistency (e.g., to allow the atomic storage operation to be rolled back, if necessary), which may significantly impact the performance of the atomic storage operations. Moreover, support for atomic storage operations may typically be provided by a layer that maintains its own, separate metadata pertaining to atomic storage operations, resulting in duplicative effort, increased overhead, and/or decreased performance.

In some embodiments, the storage metadata 434 is leveraged and/or extended to provide efficient atomic storage operations through the VSL interface 440. Consistency of the storage metadata 434 may be maintained by deferring updates until the one or more storage operations comprising the atomic storage request are complete. Metadata pertaining to storage operations that are "in process" (e.g., ongoing operations that are not yet complete) may be maintained in separate "inflight" metadata, described below. Accordingly, in certain embodiments, the state of the storage metadata 434 is maintained until the atomic storage operation successfully completes, obviating the need for extensive post-failure "roll back" operations.

The sequential, log-based data format provides an "event log" of storage operations on the non-volatile storage device 402. The sequential, log-based storage retains multiple copies of data (e.g., previous versions of the data) on the non-volatile storage device 402. The previous versions may be retained until the data is marked as invalid in the storage metadata 434 and/or the data is recovered in a grooming operation.

As discussed above, the storage metadata 434 may be reconstructed from the sequential, log-based data stored on the non-volatile storage device 402. The up-to-date version of data is identified based upon the location of the append point and/or sequence indicators associated with the data. During reconstruction, data pertaining to an incomplete atomic storage request may be identified (and discarded) using persistent metadata associated with the data, as depicted in FIG. 8.

In some embodiments, the VSL 430 provides atomic storage operations by storing data in a sequential, log-based format, storing data pertaining to an atomic storage request together with persistent metadata on the non-volatile storage device, and/or acknowledging completion of the atomic storage request when the one or more storage operations are complete. The logical identifiers of the atomic storage request may be noncontiguous. Completion of a storage request may comprise transferring data to a write buffer, a protection domain, a powercut safe domain, and/or storing the data on a non-volatile storage device 402. The persistent metadata may be stored with data of the atomic storage request in a single storage operation. The storage metadata 434 may be preserved while an atomic storage operation is in process by deferring updates to the storage metadata 434 until the atomic storage operation is complete. Metadata pertaining to an atomic storage operation that is in progress may be maintained in a separate index (inflight index). In some embodiments, a first persistent metadata flag identifies data pertaining to the atomic storage request, and a second persistent metadata flag indicates completion of the atomic storage request. An incomplete atomic storage request is identified when the non-volatile storage device 402 comprises the first flag, but not the second flag. Alternatively, the persistent metadata flags may comprise an identifier (e.g., transaction or atomic storage request identifier). Storage operations of an atomic storage request may be completed despite invalid shutdown conditions, such as a failure of a host computing device 401, power loss or the like. Assignments between logical identifiers and physical storage locations may be preserved until the atomic storage operation completes. Metadata pertaining to in process atomic storage operations may be maintained in an inflight index, which may be separate from other storage metadata. The inflight index may be accessed to identify read and/or write hazards pertaining to the atomic storage request.

Grouping Data

As was described above, data may be written to an append point of a log-based structure such as the log-based structures described above (e.g., the log-based structure described in relation to FIG. 7A). The log-based structure may comprise a plurality of logical erase blocks wherein each logical erase block may store data associated with many different logical identifiers. Over time, a user may modify or replace data stored in the log-based structure. In doing so, the modified or replaced data may be appended to the head of the log-based structure and the original data may be marked as invalid as was described above. As result of such modifications, the logical erase blocks of the log-based structure may eventually be partially or fully invalidated.

For example, when data is first written to a logical erase block, the entire logical erase block may contain valid data. Later, a portion of the data stored by the logical erase block (e.g., data of one of the logical identifiers associated with the logical erase block) may be invalidated due to a modification. As a result, the logical erase block is partially invalidated since it now stores some data that is valid and other data that is invalid. Since the logical erase block is partially invalidated, it is a candidate for processing by the garbage collection system (described above, also referred to herein as a groomer), which may act to recover the space consumed by the invalid data of the logical erase block.

Figure 9:
FIG. 9 is a chart illustrating a typical log-based structure curve according to one embodiment.

Referring to FIG. 9, a curve 902 is shown that illustrates the percentage of an erase block marked invalid relative to erase block log age. Erase block log age is used herein to refer to an age of an erase block within a log-based structure. In one embodiment, the age may be an amount of time that the erase block has stored data associated with the log-based structure. In another embodiment, the age may be a relative indicator indicating whether a particular logical erase block is older or younger within the log-based structure than another logical erase block of the log-based structure. As illustrated in FIG. 9, the oldest erase blocks are shown on the left and the youngest erase blocks are shown on the right.

Curve 902 is typical for data stored by a log-based structure. Note that the youngest erase blocks (those most recently written to the log-based structure) are entirely or almost entirely valid since they were recently written to the log-based structure. Over time, the percentage of an erase block that is invalid increases to about 20% due to data modifications or deletions as described above. Of course, curve 902 may change over time. Sometimes, peaks rising above 20% may form. In some embodiments, a groomer or garbage collection system (as described above) may identify the logical erase blocks associated with such peaks and may groom the identified logical erase blocks by: (1) removing valid data from the logical erase blocks, (2) rewriting the valid data to the head of the log-based structure, and (3) erasing the identified logical erase blocks.

In such a system in which a groomer grooms logical erase blocks that are highly invalid, many logical erase blocks will be overlooked for grooming. For example, logical erase blocks that are 20% invalid may be overlooked for grooming in favor of logical erase blocks that are 80% invalid. Though such erase blocks are only 20% invalid, they still contain a significant amount of storage space that could be recovered by the groomer and put to better use.

Figure 10:
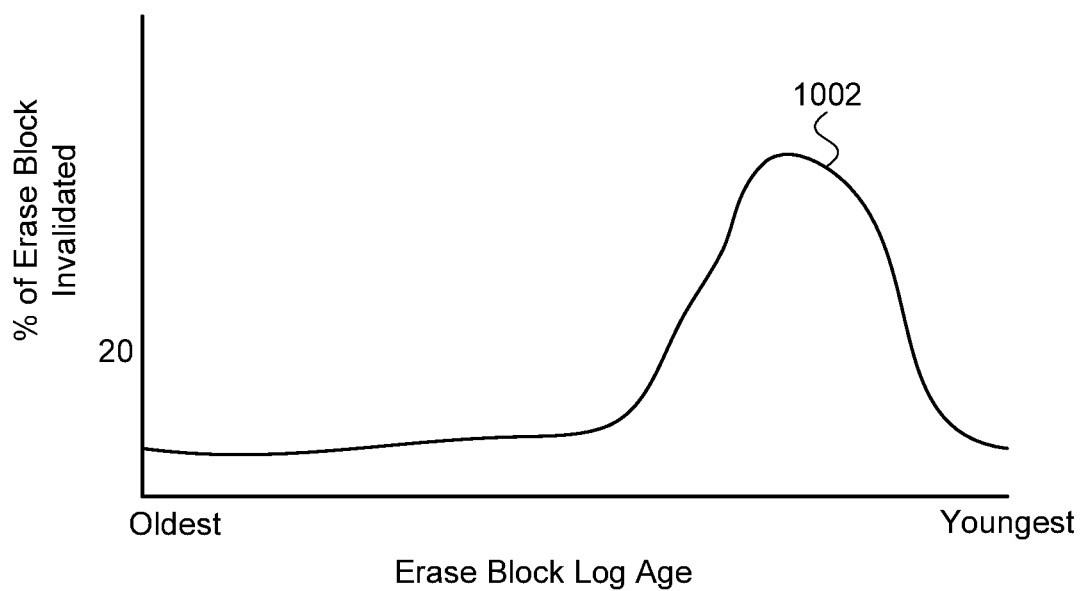
FIG. 10 is a chart illustrating a desired log-based structure curve according to one embodiment.

Referring to FIG. 10, another curve 1002 is illustrated. Curve 1002 represents an ideal or desired shape for a log-based structure. Note that curve 102 includes a large peak near the head of the log-based structure and that the tail to the left of the peak is well below 20%. Curve 1002 may be more desirable than curve 902 because much of the unused capacity (invalid portions) of the older logical erase blocks of curve 902 has been groomed or recovered in curve 1002. Accordingly, a higher percentage of the logical erase blocks of the log-based structure are being used to store valid data in curve 1002 then in curve 902.

Several methods will be described below that may be used to groom a log-based structure so that the log-based structure has a curve similar to curve 1002 rather than a curve similar to 902. Curve 1002 is one example of a curve more desirable than curve 902. Other curves more desirable than curve 902 are also possible, for example, a curve having a large peak on the left and a low tail on the right (e.g., a horizontally mirrored version of curve 1002).

Figure 11:
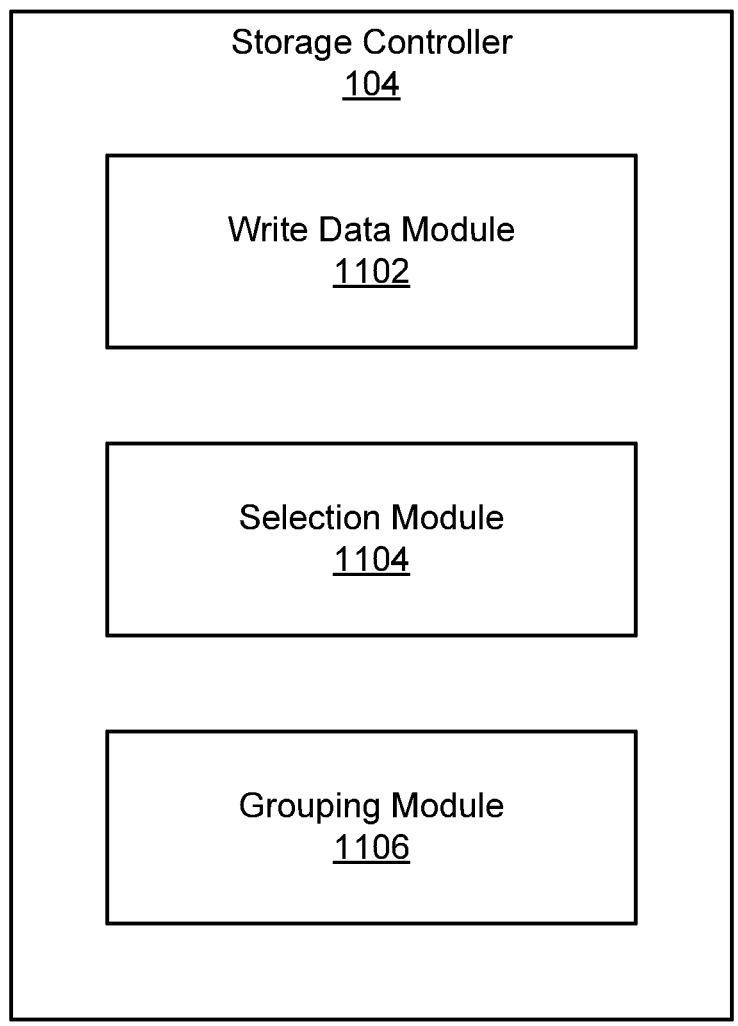
FIG. 11 is a block diagram of a storage controller according to one embodiment.

FIG. 11 illustrates modules that may perform such methods. As illustrated in FIG. 11, storage controller 104 may include a write data module 1102 that sequentially writes user data to an append point at a head of a log (i.e., a log-based structure) stored in an array of solid-state storage elements. In some embodiments, write data module 1102 may include write data pipeline 106.

Storage controller 104 may also include a selection module 1104 that selects partially invalidated logical erase blocks of the array based on a characteristic for the partially invalidated logical erase blocks. Storage controller 104 may also include a grouping module 1106 that arranges valid portions of the selected partially invalidated logical erase blocks into groups based on the characteristic. Write data module 1102 may write the groups of valid portions to the log. In some cases, as will be described below, write data module 1102 may write at least one of the groups to a position in the log other than the head of the log, and write data module 1102 may determine the position based on the characteristic.

Figure 12:
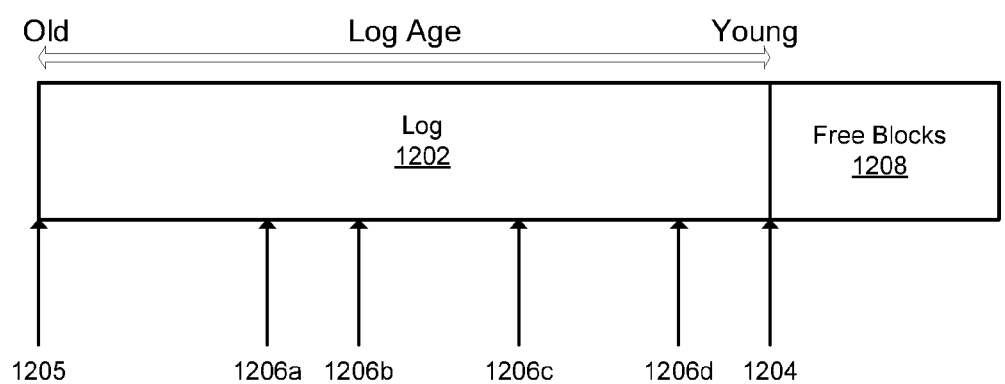
FIG. 12 illustrates an organization of logical erase blocks according to one embodiment.

FIG. 12 illustrates a representation of logical erase blocks of an array of solid-state storage elements. The representation includes logical erase blocks forming a log 1202 (i.e., a log-based structure as described herein) having a head 1204, tail 1205, and multiple append points 1206. The representation also includes free logical erase blocks 1208 available to be added to the log and to store user data. At a point in time when log 1202 is formed, and for some time thereafter, free logical erase blocks 1208 may include logical erase blocks that have not yet stored user data (have not yet been programmed with user data). Later, free logical erase blocks 1208 may also include logical erase blocks that were part of log 1202 but were subsequently groomed of their valid data and were then erased. Note that logical erase blocks near head 1204 have a log age younger than logical erase block near tail 1205 because such blocks were added to log 1202 more recently than logical erase blocks near tail 1205.

In some log-based structures, data is appended to the log-based structure only at head 1204. Doing so ensures that data is ordered within the log-based structure according to a sequence in which the data was appended to the log-based structure. As will be described below, according to some embodiments, data stored in log 1202 may be extracted from log 1202 and may be written back to log 1202 at an append point 1206 not located at head 1204. In other embodiments, data stored in log 1202 may be extracted from log 1202 and may be written to different log-based structures. The different log-based structures may reside on the same storage device 102 or on a different device 102.

According to one embodiment, a method of grouping data stored on an array of solid-state storage elements includes the following. Write data module 1102 sequentially writes user data to an append point at a head 1204 of a log 1202 stored in an array of solid-state storage elements. The user data may be stored in a plurality of logical erase blocks of the array. Selection module 1104 selects partially invalidated logical erase blocks of the array based on a characteristic for the partially invalidated logical erase blocks. In one embodiment, the characteristic used by grouping module 1106 indicates a likelihood (either high or low) that a particular logical erase block will be modified in the future. Grouping module 1106 arranges valid portions of the selected partially invalidated logical erase blocks into groups based on the characteristic and write data module 1102 writes the groups of valid portions to log 1202. Typically, write data module 1102 writes the groups of valid portions in to log 1202 in logical erase blocks other than the partially invalidated logical erase blocks from which the valid portions were selected. Such logical erase blocks, at least initially, comprise only valid data and thus are not partially invalidated. After write data module 1102 has written the groups to log 1202, storage controller 104 erases the partially invalidated logical erase blocks and makes the erased logical erase blocks available for subsequent reprograming with user data.

Grouping the valid portions based on the characteristic may advantageously result in some logical erase blocks that are likely to have a lower invalidity percentage over time than if the valid portions were not grouped and other logical erase blocks that are likely to have a higher invalidity percentage over time than if the valid portions were not grouped. Storage controller 104 may shape the curve of the percentage of an erase block marked invalid relative to erase block log age for log 1202 to approximate curve 1002 of FIG. 10 by appending logical erase blocks likely to have a lower invalidity percentage over time to log 1202 in the tail of the curve (e.g., at point 1206a), rather than at head 1204, and appending logical erase blocks likely to have a higher invalidity percentage over time to log 1202 in the peak of the curve (e.g., at point 1206d), rather than at head 1204. In another embodiment, rather than shaping the curve as described above, storage controller 104 may append the logical erase blocks likely to have a lower invalidity percentage over time to one log and may append the logical erase blocks likely to have a higher invalidity percentage over time to log 1202 in the peak of the curve. In this manner, logical erase blocks may be separated over time in two (or more, if grouping module 1106 groups logical erase blocks in to more than two groups) different logs. Having two different logs may advantageously allow storage controller 104 to treat the two logs differently.

In one embodiment, the characteristic used by grouping module 1106 is a log age indicative of how long the selected logical erase block has been stored in log 1202. The principle behind such grouping is that a valid portion of a partially invalidated logical erase block that has been in log 1202 a long time (has a relatively old log age) has not been modified for a similarly long time and thus is not likely to be modified in the future. According to this principle, the longer a valid portion has been stored in log 1202, the less likely it is that the valid portion will be modified in the future, though there is always a possibility that the valid portion will be modified in the future. In contrast, if a valid portion has been stored in log 1202 a short time (has a relatively young log age) there is a greater likelihood that the valid portion will be modified in the future. In general, the log age of a logical erase block indicates, to some degree, a likelihood that a particular logical erase block will be modified in the future.

By grouping valid portions having similar log ages together, rather than grouping valid portions without regard for their log ages as is typical when appending data only at head 1204, logical erase blocks storing the groups will be more likely to have either a lower invalid percentage or a higher invalid percentage than if the grouping was not performed. This result is advantageous because the logical erase blocks having a lower invalid percentage will contain less wasted space (invalid portions) and the logical erase blocks having a higher invalid percentage can be efficiently identified and groomed, thereby recovering storage capacity of the array of solid-state storage elements that log 1202 can use in the future. This increased efficiency helps to increase the overall usable capacity of the array of solid-state storage elements.

In one embodiment, each logical erase block is assigned a sequence number indicating when the logical erase block was first written to log 1202 relative to other logical erase blocks of the array. In this case, the sequence number serves as the characteristic by which grouping module 1106 groups valid portions. The sequence number of a logical erase block may be described as being metadata of the logical erase block (data describing the logical erase block) since the sequence number is not user data supplied by a user. Thus, it may be said that the characteristic used for grouping comes from metadata of a logical erase block, not from the valid portions themselves. Other characteristics may alternatively or additionally be used. For example, as described herein, the characteristic may come from the valid portions themselves.

Figure 13:
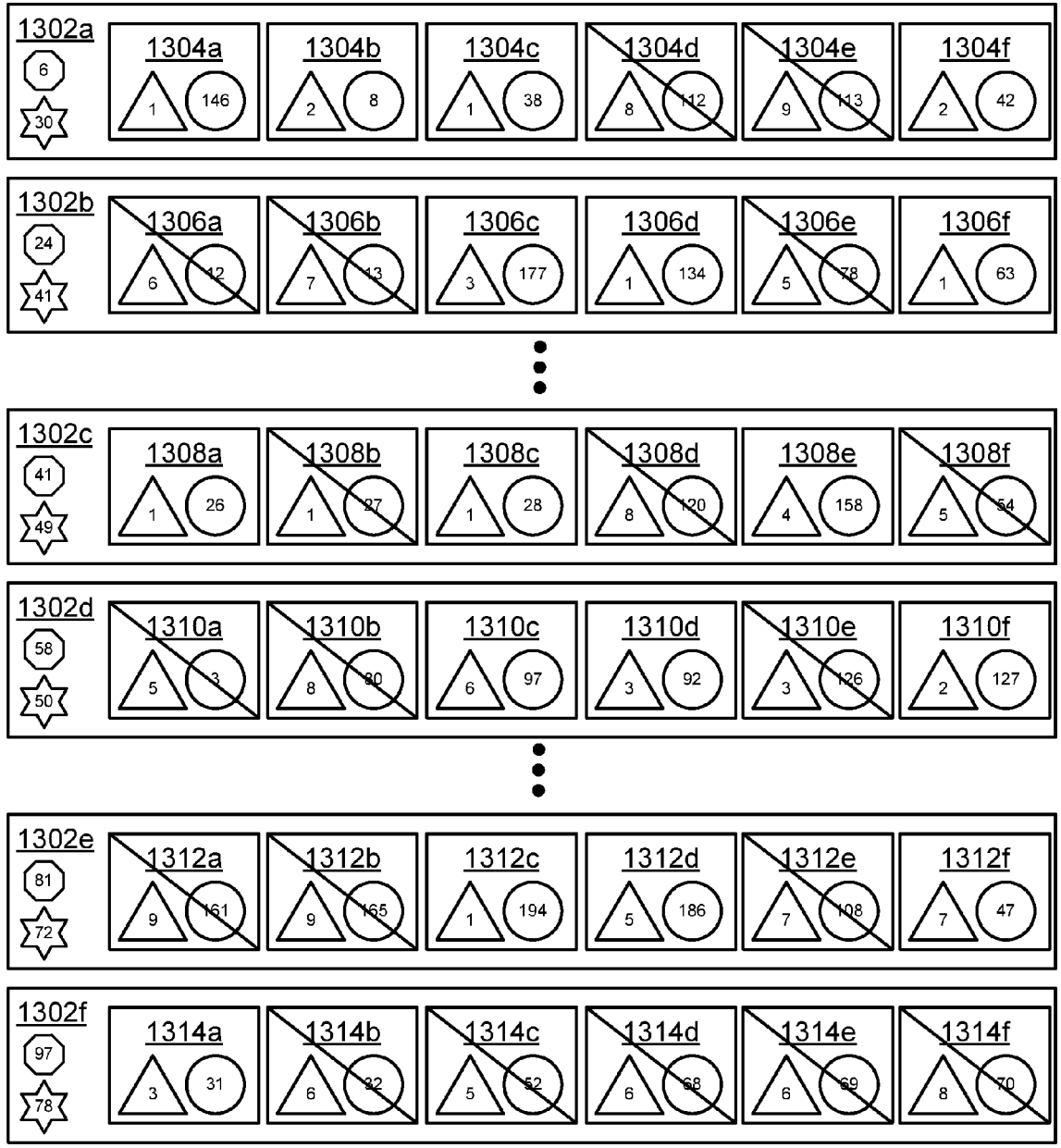
FIG. 13 illustrates logical erase blocks according to one embodiment.

Referring to FIG. 13, logical erase blocks 1302 are illustrated. Logical erase blocks 1302 illustrate a number of different characteristics that may be used by grouping module 1106. For example, logical erase blocks 1302 each have a sequence number (symbolized by an octagon) indicating when the logical erase block 1302 was written to the log relative to the other logical erase blocks 1302. Logical erase block 1302*a* has sequence number 6, which indicates that it was written to log 1202 prior to logical erase block 1302*d*, which has sequence number 58. Similarly, logical erase block 1302*c* has sequence number 41, which indicates that it was written to log 1202 after logical erase block 1302*b*, which has sequence number 24. Each logical erase block 1302 also has a block age (symbolized by a star) which will be further discussed below. Log 1202 may include many more logical erase blocks 1302 than are illustrated in FIG. 13.

Each logical erase block 1302 includes several portions. Logical erase block 1302*a* includes portions 1304, logical erase block 1302*b* includes portions 1306, logical erase block 1302*c* includes portions 1308, logical erase block 1302*d* includes portions 1310, logical erase block 1302*e* includes portions 1312, and logical erase block 1302*f* includes portions 1314. In one embodiment, each portion may store user data and may be associated with a different logical identifier (as was discussed above in relation to FIG. 4). One example of a logical identifier is a logical block address of a logical address space (e.g., logical address space 432 of FIG. 4). As depicted in FIG. 13, each portion has a different logical block address (symbolized by a circle). Each portion also has an activity level (symbolized by a triangle), which will be further discussed below. Although FIG. 4 illustrates sequence numbers, block ages, and activity levels, not all of these are necessarily present in all embodiments. In one embodiment, logical erase blocks 1302 include a sequence number, but no block age, and the portions do not include an activity level. Invalid portions of FIG. 13 are marked with a slash. Thus, portions 1304*d* and 1304*e* are invalid portions, for example. The invalid portions may store user data that has been invalidated by replacement user data. In some embodiments, the portion itself may not indicate that the portion is invalid. Rather, the forward map or reverse map (discussed above in relation to FIGS. 5 and 6) may indicate that the portion is invalid.

In one embodiment, write data module 1102 sequentially writes logical erase blocks 1302 to log 1202 stored in an array of solid-state storage elements by writing logical erase block 1302*a* first, then 1302*b*, and so on. In one example, selection module 1104 selects logical erase blocks from among logical erase blocks 1302 based on the characteristic (e.g., low (old) sequence numbers). Grouping module 1106 then arranges valid portions of the selected logical erase blocks into groups based on the sequence numbers.

Figure 14:
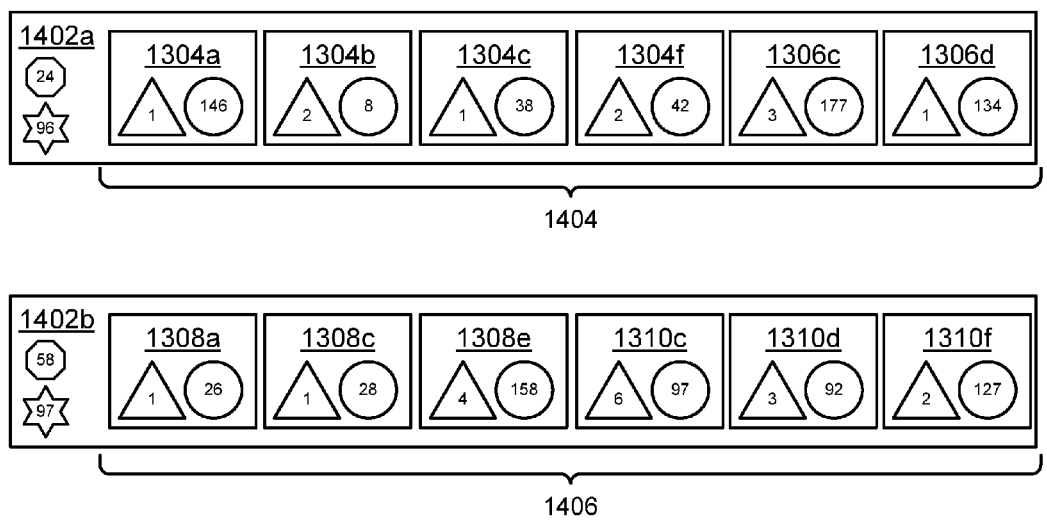
FIG. 14 illustrates groups of portions of logical erase blocks according to one embodiment.

FIG. 14 illustrates two such groups arranged by grouping module 1106. The first group 1404 includes valid portions 1304*a*, 1304*b*, 1304*c*, and 1304*f* from logical erase block 1302*a* and valid portions 1306*c* and 1306*d* from logical erase block 1302*b*. Invalid portions 1304*d*, 1304*e*, 1306*a*, 1306*b*, and 1306*e* are not included in group 1404 since they are invalid and need not be stored. The second group 1406 includes valid portions 1308*a*, 1308*c*, and 1308*e* from logical erase block 1302*c* and valid portions 1310*c*, 1310*d*, and 1310*f* from logical erase block 1302*d*. Note that grouping module 1106 has arranged groups 1404 and 1406 based on sequence numbers of logical erase blocks 1302*a*, 1302*b*, 1302*c*, and 1302*d* since valid portions from logical erase blocks 1302*a* and 1302*b*, which have the lowest sequence numbers of logical erase blocks 1302 (and thus have been part of log 1202 the longest of logical erase blocks 1302) are together in group 1404. Thus, grouping module 1106 has grouped valid portions into group 1404 based on a characteristic (in this case log age as indicated by sequence number) of logical erase blocks 1302. Group 1406 includes valid portions from logical erase blocks 1302*c* and 1302*d*, which have the next two oldest (lowest) sequence numbers.

In one embodiment, grouping module 1106 arranges valid portions into groups sized to fit in a logical erase block of the array of solid-state storage elements. Write data module 1102 then writes each group into a different logical erase block of the array. The logical erase blocks in which the groups are written may be selected from among free blocks 1208. For example, group 1404 is sized to fit within (and typically to fill) logical erase block 1402*a* and group 1406 is sized to fit within (and typically to fill) logical erase block 1402*b*. Write data module 1102 forms logical erase blocks 1402 and writes logical erase blocks 1402 to log 1202. Prior to doing so, write data module 1102 may assign a sequence number to each logical erase blocks 1402. In one embodiment, write data module 1102 selects a sequence number for logical erase block 1402*a* from among the sequence numbers of logical erase blocks 1302*a* and 1302*b* (the logical erase blocks from which the portions of logical erase block 1402*a* were taken). Accordingly, write data module 1102 selects a sequence number for logical erase block 1402*a* from among sequence numbers 6 and 24. In one embodiment, write data module 1102 selects the youngest (highest) sequence number, in this case 24 and assigns sequence number 24 to logical erase block 1402*a*.

By assigning sequence number 24 to logical erase block 1402*a* in this manner, write data module 1102 effectively appends logical erase block 1402*a* to log 1202 at a point 1206*a* other than head 1204. Point 1206*a* is determined based on the position of sequence number 24 within the sequence numbers currently a part of log 1202. In contrast, if logical erase block 1402*a* was appended to log 1202 at head 1204, logical erase block 1402*a* would receive a sequence number that is currently the youngest (highest) sequence number.

Similarly, write data module 1102 may select a sequence number for logical erase block 1402*b* from among sequence numbers 41 and 58 (the sequence numbers of logical erase blocks 1302*c* and 1302*d*, the logical erase blocks from which the valid portions of logical erase block 1402*b* were taken). In one embodiment, write data module 1102 selects sequence number 58 for logical erase block 1402*b* and writes logical erase block 1402*b* to log 1202. By assigning sequence number 58, write data module 1102 effectively appends logical erase block 1402*b* to log 1202 at point 1206*b* rather than head 1204. Note that point 1206*b* is different from point 1206*a* since logical erase block 1402*b* has sequence number 58, which falls in a different position of log 1202 than point 1206*a*, which is associated with sequence number 24.

Put another way, it may be said that for each of groups 1404 and 1406, write data module 1102 determines a group log age (in this case a sequence number) based on the log ages of the selected partially invalidated logical erase blocks associated with the valid portions of the group. Furthermore, write data module 1102 writes groups having a younger log age (and in this case a higher sequence number) closer to head 1204 of log 1202 than groups having an older log age (and in this case a lower sequence number). In one particular example, write data module 1102 determines a group log age (e.g., sequence number 24) based on the log ages (sequence numbers 6 and 24) of logical erase blocks 1302*a* and 1302*b*, from which the valid portions of group 1404 were taken.

Furthermore, it may be said that write data module 1102 may write groups more likely to be modified in the future closer to head 1204 than groups less likely to be modified in the future. For example, group 1404 is less likely to be modified in the future than group 1406 because group 1404 has an older log age (lower group log age) than group 1406. Thus, write data module 1102 writes group 1404 at position 1206*a* and writes group 1406 at position 1206*b*, which is close to head 1204 than position 1206*a*.

As was mentioned above, write data module 1102 may select a logical erase block from the logical erase blocks of free blocks 1208 in which to write a group of valid portions. In doing so, write data module 1102 may select logical erase blocks from free blocks 1208 that are well suited to storing the valid portions. For example, write data module 1102 may select a logical erase block having a higher program/erase cycle count than other logical erase blocks of free blocks 1208 when writing valid portions that are unlikely to change in the future. This approach tends to reduce the number of additional program/erase cycles that the selected logical erase block will undergo in the future since the valid portions stored in the selected logical erase block are not likely to change and therefore the selected logical erase block is unlikely to be groomed (and therefore erased) in the future. In this manner, write data module 1102 may delay the retirement of a logical erase block having a relatively high program/erase cycle count.

In other embodiments, write data module 1102 may consider additional or other characteristics of the logical erase blocks of free blocks 1208 when selecting a logical erase block in which to write a group of valid portions. For example, NAND flash logical erase blocks known to have a higher threshold voltage may be selected for certain groups (e.g., groups not likely to be modified in the future), logical erase blocks located in less desirable (e.g., error prone) portions of the array may be selected for certain groups, logical erase blocks located on physical storage media having certain endurance properties and/or physical storage characteristics (e.g., certain level of program/erase cycle count, certain NAND Flash media type (SLC, MLC), error prone, etc.) with respect to other media of the array may be selected for certain groups and so on.

For some types of user data, the data is most likely to be modified by a user shortly after the data is written to log 1202. Consequently, some logical erase blocks may have a high percentage of invalidity shortly after being written to log 1202. These logical erase blocks may be identified by their high percentage of invalidity and may be efficiently groomed. To prevent such logical erase blocks from being subjected to the grouping method described above, in some embodiments, selection module 1104 may be configured to select only those logical erase blocks that have been part of log 1202 for at least a predetermined amount of time. One way of implementing this time threshold relies on determining an amount of time that has passed since a logical erase block has been programmed. Thus, when selecting a logical erase block, selection module 1104 may determine that the predetermined minimum amount of time has passed since the logical erase block was last programmed prior to selecting the logical erase block and thus prior to grouping module 1106 grouping any of the valid portions of the logical erase block.

Figure 15:
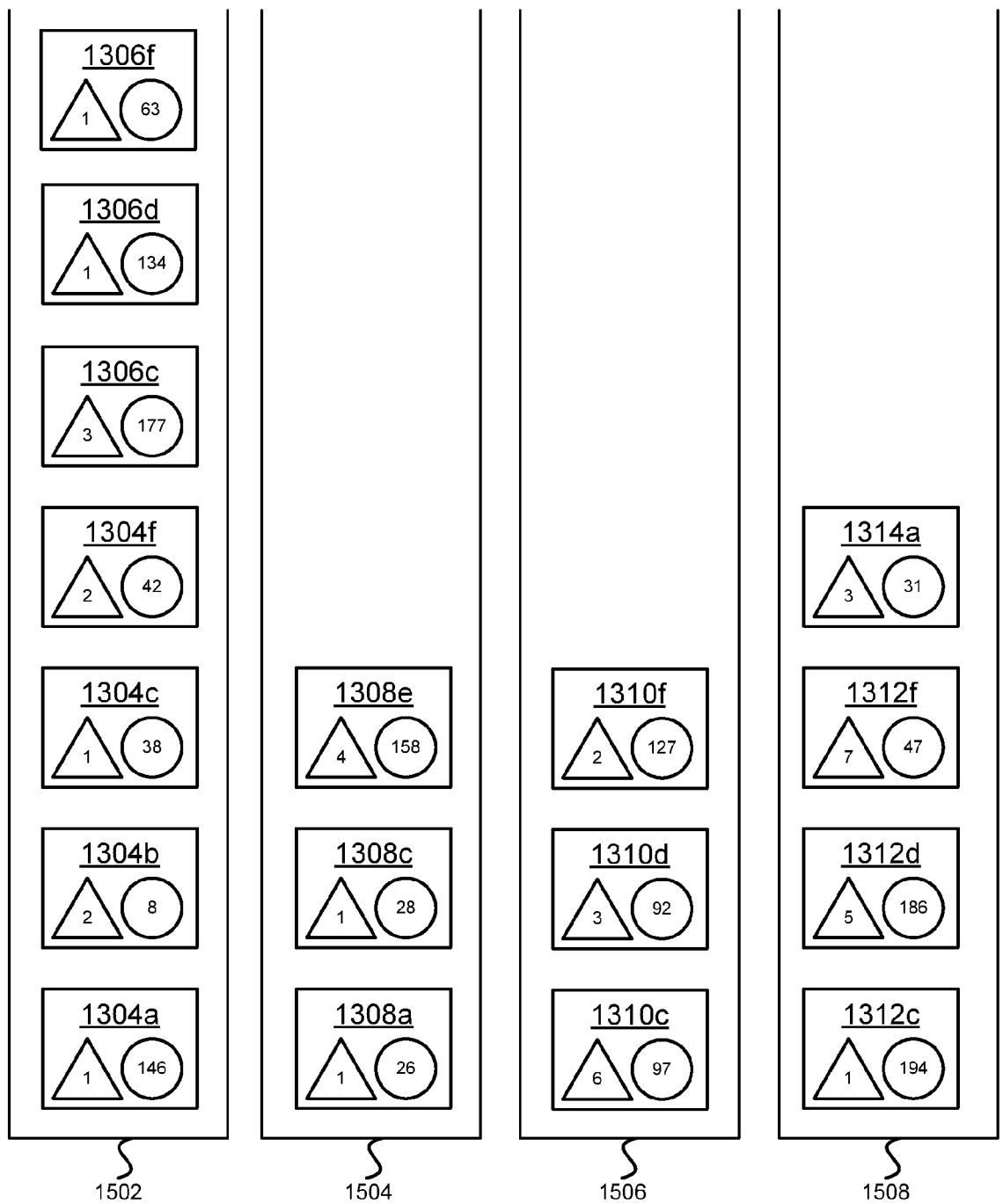
FIG. 15 illustrates arranging valid portions of logical erase blocks into sets according to one embodiment.

In some embodiments, grouping module 1106 may arrange valid portions in sets based on the characteristic prior to arranging the valid portions in groups (e.g., groups 1404 and 1406). FIG. 15 illustrates one example of using such sets. Four sets 1502, 1504, 1506, and 1508 are illustrated. Each set may be associated with a particular range of the characteristic. If the characteristic is log age, each set may be associated with a range of log ages. In some embodiments, the ranges may be non-overlapping. In the example illustrated in FIG. 15, set 1502 is associated with log ages 1-25, set 1504 is associated with log ages 26-50, set 1506 is associated with log ages 51-75, and set 1508 is associated with log ages 76-100. Each set may serve as a bucket for accumulating valid portions. Once enough valid portions have been accumulated in a set to form a group sized to fit within (and typically fill) a logical erase block, the valid portions of a set are grouped and then written to log 1202 in a logical erase block using the methods described herein. In some cases, each group and/or each set may be written to a different append point of log 1202. The use of sets may provide a convenient way to group valid portions according to the characteristic. In one embodiment, each set is associated with a different log and grouped valid portions of each set are written to their respective different logs.

As illustrated in FIG. 15, set 1502 includes seven valid portions, which is enough to fill a logical erase block according to the example logical erase blocks of FIGS. 13 and 14. Accordingly, the bottom six valid portions may be grouped into, for example, group 1404 and written to log 1202, leaving portion 1306*f* to wait in set 1502 until enough additional valid portions are assigned to set 1502 to form another group. As illustrated in FIG. 15, sets 1504, 1506, and 1508 do not yet have sufficient valid portions to form groups. Over time, grouping module 1106 may assign additional valid portions to the sets of FIG. 15 and may group valid portions from a set into a group when sufficient valid portions have been accumulated in a set.

In one embodiment, grouping module 1106 may create the sets and track valid portions assigned to sets in memory of host computing system 114. To prevent permanent loss of the data stored by the valid portions, each valid portion assigned to a set may remain stored in the array in its partially invalid logical erase block until grouping module 1106 assigns the valid portion to a group and write data module 1102 writes the group to log 1202. Thereafter, the partially invalid logical erase block may be erased.

The description above has detailed the use of log age as a characteristic of a logical erase block. The methods and devices described herein may use alternative or additional logical erase block characteristics. For example, the characteristic may be a block age, such as a sequence number or time stamp, indicative of how long it has been since a logical erase block was last programmed. Such block ages are illustrated using stars in FIGS. 13 and 14.

In another embodiment, the characteristic of a logical erase block may indicate a likelihood that the logical erase block will be modified in the future. The likelihood may be derived from characteristics of valid portions of the logical erase block in one embodiment, but may be associated with the logical erase block as a whole, rather than with individual valid portions.

The characteristics described above may vary per logical erase block, not necessarily per individual valid portion stored by an individual logical erase block. Using a characteristic representing the entire logical erase block helps to simplify the operation of storage controller 104 when compared to using characteristics of individual valid portions by reducing the number of characteristics to be considered and by reducing the amount of capacity of the array of solid-state storage devices used to store the characteristic.

In an alternative embodiment, selection module 1104 and grouping module 1106 may use attributes of individual valid portions in addition to, or instead of, characteristics of the logical erase blocks storing the individual valid portions. In one embodiment, the attribute is a user activity level indicative of how frequently the user modifies data associated with the logical block address associated with the valid portion. According to this embodiment, selection module 1104 may select partially invalidated logical erase blocks based on the attributes of valid portions of the partially invalidated logical erase blocks and grouping module 1106 may group the valid portions based on the attribute.

As illustrated in FIG. 13, each valid portion 1304, 1306, 1308, 1310, 1312, and 1314 may be associated with a different logical block address (symbolized with a circle) and may have an activity level (symbolized with a triangle). The activity level may indicate how frequently the user modifies the data associated with the logical block address. For example, in the embodiment illustrated in FIG. 13, the activity level may vary from 1 (low activity, also referred to as static or cold) to 10 (high activity, also referred to as active or hot) and grouping module 1106 may group valid portions having similar activity levels together. In one embodiment, grouping module 1106 may arrange valid portions in sets (as described above in relation to FIG. 15) based on the activity levels of the valid portions. In this manner, valid portions having similar activity levels are grouped together and written to the same logical erase block. In one embodiment, write data module 1102 writes groups having a high activity level satisfying a threshold to head 1204 of log 1202 and writes groups having activity levels not satisfying the threshold to an intermediate position within logs 1202 (e.g., position 1206*c*).

In one embodiment, the attribute (e.g., activity level) of a valid portion is assigned by a user and the valid portion itself stores the attribute. In another embodiment, the attribute is inferred (e.g., by storage controller 104) and is stored apart from the valid portion as metadata. In one embodiment, the attribute is a count indicating the number of times the logical block address has been written. This count is indicative of the activity level of the logical block address (and therefore the portion) since logical block addresses having a relatively high count can be considered to have a high activity level and logical block addresses having a relatively low count can be considered to have a low activity level. Storage controller 104 may keep the count for each logical block address and may store the count as metadata, for example, in the forward map or reverse map.

Although several different characteristics and attributes have been described herein, the methods and modules may use other characteristics and attributes that tend generally to distinguish data that is highly likely to be modified in the future from data less likely to be modified in the future. Furthermore, note that the method of grouping valid portions described above is one method of grooming existing user data already stored by the array of solid-state storage elements. In one embodiment, new user data received from a user may continue to be written to head 1204 of log 1202 regardless of any characteristics of the user data.

I claim:

1. A method, comprising:
    sequentially writing user data to an append point at a head of a log stored in an array of solid-state storage elements, the user data stored in one or more logical erase blocks of a plurality of logical erase blocks of the array;
    selecting partially invalidated logical erase blocks of the array based on a characteristic for the partially invalidated logical erase blocks;
    arranging valid portions of the selected partially invalidated logical erase blocks into groups based on the characteristic; and
    writing the groups of valid portions to the log, wherein the writing comprises writing at least some of the groups to positions of the log other than the head of the log, wherein the positions are determined based on the characteristic and based on the positions' relationship to the other positions.

2. The method of claim 1 wherein for each of the selected logical erase blocks, the characteristic comprises a log age indicative of how long the selected logical erase block has been stored in the log.

3. The method of claim 2 wherein, for each of the selected logical erase blocks, the characteristic comprises a sequence number indicating when the selected logical erase block was first written to the log relative to the other logical erase blocks of the array; and
    wherein the method further comprises selecting sequence numbers for the groups written to the log from among the sequence numbers of the selected logical erase blocks.

4. The method of claim 2 further comprising:
    for each group, determining a group log age based on the log ages of the selected partially invalidated logical erase blocks associated with the valid portions of the group; and
    wherein the writing comprises writing groups having a younger group log age closer to the head of the log than groups having an older group log age.

5. The method of claim 4 wherein the writing comprises writing the group with an oldest group log age to a selected logical erase block of a set of free logical erase blocks of the array, the selected logical erase block having a highest program/erase cycle count of the set.

6. The method of claim 1 further comprising:
selecting available erase blocks of the array based on the characteristic; and
wherein the writing comprises writing the groups to the selected available erase blocks.

7. The method of claim 1 wherein the arranging comprises arranging based on an attribute for the valid portions.

8. The method of claim 7 wherein:
each of the valid portions is associated with a different logical block address of a user address space; and
for each of the valid portions, the attribute is a user activity level indicative of how frequently the user modifies data associated with the logical block address for the valid portion.

9. The method of claim 8 wherein the writing comprises writing active groups having user activity levels satisfying a threshold to the head of the log and writing groups having user activity levels not satisfying the threshold to an intermediate position within the log.

10. The method of claim 1 wherein for each of the selected logical erase blocks, the characteristic indicates a likelihood that the selected logical erase block will be modified in the future.

11. The method of claim 10 wherein the writing comprises writing groups more likely to be modified in the future closer to the head of the log than groups less likely to be modified in the future.

12. The method of claim 1 wherein each group is sized to fit in a logical erase block of the array, and wherein the writing comprises writing each group into a different logical erase block of the array.

13. The method of claim 1 wherein the selecting comprises determining that a predetermined minimum amount of time has passed since the selected logical erase blocks were last programmed.

14. The method of claim 1 further comprising:
prior to arranging the valid portions into groups, arranging the valid portions into sets based on the characteristic; and
wherein arranging the valid portions into groups comprises, for each set, dividing the valid portions of the set into the groups, the groups sized to fit in a logical erase block of the array, and wherein the writing comprises writing each group to a different logical erase block of the array.

15. The method of claim 14 wherein the writing comprises writing each set to a different append point of the log.

16. An apparatus, comprising:
a write data module that sequentially writes user data to a first append point at a head of a log stored in an array of solid-state storage elements, the user data stored in a plurality of logical erase blocks of the array;
a selection module that selects partially invalidated logical erase blocks of the array based on a characteristic for the partially invalidated logical erase blocks;
a grouping module that arranges valid portions of the selected partially invalidated logical erase blocks into groups based on the characteristic;
wherein the write data module writes the groups of valid portions to the log and writes at least one of the groups to a second of a plurality of append points at positions in the log other than the head of the log, wherein the write data module selects the second append point from among others of the plurality of append points based on the characteristic and based on the second append point's position relative to the head; and
wherein the write data module, the selection module, and the grouping module comprise one or more of logic hardware and a non-transitory computer readable medium having executable code stored thereon.

17. The apparatus of claim 16 wherein, for each of the selected logical erase blocks, the characteristic comprises a log age indicative of how long the selected logical erase block has been stored in the log.

18. A system, comprising:
an array of solid-state storage elements; and
a storage controller comprising:
a write data module configured to sequentially write user data to an append point at a head of a log stored in an array of solid-state storage elements, the user data stored in a plurality of logical erase blocks of the array;
a selection module configured to select partially invalidated logical erase blocks of the array based on a characteristic for the partially invalidated logical erase blocks;
a grouping module configured to arrange valid portions of the selected partially invalidated logical erase blocks into groups based on the characteristic; and
wherein the write data module is configured to:
for each group, select a position within the log, wherein the positions are selected relative to the head based on the characteristic for the groups; and
write the groups to the log at the selected positions.

19. The system of claim 18 wherein, for each of the selected logical erase blocks, the characteristic indicates a likelihood that the selected logical erase block will be modified in the future.

* * * * *